United States Patent
Nemser et al.

(10) Patent No.: US 8,506,815 B2
(45) Date of Patent: Aug. 13, 2013

(54) REMOVAL OF WATER FROM FLUIDS

(75) Inventors: Stuart M. Nemser, Wilmington, DE (US); Sudipto Majumdar, Newark, DE (US); Kenneth J. Pennisi, Bear, DE (US)

(73) Assignee: CMS Technologies Holdings Inc., Newport, DE (US)

( * ) Notice: Subject to any disclaimer, the term of this patent is extended or adjusted under 35 U.S.C. 154(b) by 0 days.

(21) Appl. No.: 13/552,745

(22) Filed: Jul. 19, 2012

(65) Prior Publication Data

US 2012/0283489 A1    Nov. 8, 2012

Related U.S. Application Data

(63) Continuation of application No. 11/924,942, filed on Oct. 26, 2007.

(60) Provisional application No. 60/854,924, filed on Oct. 27, 2006.

(51) Int. Cl.
*B01D 61/36* (2006.01)
*B01D 71/32* (2006.01)
*C02F 1/44* (2006.01)

(52) U.S. Cl.
USPC ...... 210/640; 210/651; 210/653; 210/500.36; 210/500.28; 95/45; 95/52

(58) Field of Classification Search
USPC ............... 210/634, 640, 641, 644, 649, 650, 210/651, 652, 653, 654, 500.27, 500.21, 210/500.1, 500.36, 500.28; 95/45, 52, 43; 96/4, 7, 11–14
See application file for complete search history.

(56) References Cited

U.S. PATENT DOCUMENTS

| | | | | |
|---|---|---|---|---|
| 2,985,588 A | * | 5/1961 | Binning et al. | 585/819 |
| 3,308,107 A | * | 3/1967 | Selman et al. | 526/247 |
| 3,488,335 A | * | 1/1970 | Braun | 526/247 |
| 3,865,845 A | * | 2/1975 | Resnick | 549/455 |
| 4,399,264 A | * | 8/1983 | Squire | 526/247 |
| 4,431,786 A | * | 2/1984 | Squire | 526/247 |
| 4,565,855 A | * | 1/1986 | Anderson et al. | 526/247 |

(Continued)

OTHER PUBLICATIONS

Buck, Properties of Amorphous Fluoropolymers Based on 2,2-Bistrifluoromethyl-4,5-difluoro-1,3-Dioxole, Resnick, 183rd Meeting of Electrochemical Society, Honolulu, HI, May 17, 1993, pp. 1-12.*

(Continued)

Primary Examiner — David C Mellon
(74) Attorney, Agent, or Firm — Jeffrey C. Lew

(57) ABSTRACT

A method of removing water from fluid mixtures of the water with other compounds uses selective vapor permeation or pervaporation of the water, as the case may be, from the mixture through a membrane having an amorphous perfluoropolymer selectively permeable layer. The novel process can be applied in such exemplary embodiments as (a) removing water from mixtures of compounds that have relative volatility of about 1-1.1 or that form azeotropic mixtures with water, (b) the dehydration of hydrocarbon oil such as hydraulic fluid to concentrations of water less than about 50 ppm, (c) removing water byproduct of reversible chemical equilibrium reactions to favor high conversion of reactants to desirable products, (d) drying ethanol to less than 0.5 wt. % water as can be used in fuel for internal combustion engines, and (e) controlling the water content to optimum concentration in enzyme-catalyzed chemical reactions carried out in organic media.

15 Claims, 9 Drawing Sheets

(56) References Cited

U.S. PATENT DOCUMENTS

| | | | | |
|---|---|---|---|---|
| 4,597,399 | A * | 7/1986 | Rabenau et al. | 134/184 |
| 4,719,016 | A * | 1/1988 | Storkebaum et al. | 210/640 |
| 4,754,009 | A * | 6/1988 | Squire | 526/247 |
| 4,755,299 | A * | 7/1988 | Bruschke | 210/640 |
| 4,897,457 | A * | 1/1990 | Nakamura et al. | 526/247 |
| 4,900,402 | A * | 2/1990 | Kaschemekat et al. | 203/19 |
| 4,910,276 | A * | 3/1990 | Nakamura et al. | 526/247 |
| 4,944,882 | A * | 7/1990 | Ray et al. | 210/640 |
| 5,021,602 | A * | 6/1991 | Clement et al. | 558/230 |
| 5,051,114 | A * | 9/1991 | Nemser et al. | 95/47 |
| 5,116,650 | A * | 5/1992 | Bowser | 428/34.2 |
| 5,117,272 | A * | 5/1992 | Nomura et al. | 257/642 |
| 5,146,009 | A * | 9/1992 | Cohen et al. | 568/889 |
| 5,248,427 | A * | 9/1993 | Spiske et al. | 210/640 |
| 5,268,411 | A * | 12/1993 | Yokotsuka et al. | 524/462 |
| 5,382,364 | A * | 1/1995 | Bowser et al. | 210/640 |
| 5,387,378 | A * | 2/1995 | Pintauro et al. | 264/48 |
| 5,462,586 | A * | 10/1995 | Sugiyama et al. | 96/13 |
| 5,498,682 | A * | 3/1996 | Navarrini et al. | 526/247 |
| 5,510,406 | A * | 4/1996 | Matsuo et al. | 524/237 |
| 5,710,345 | A * | 1/1998 | Navarrini et al. | 568/596 |
| 5,876,604 | A * | 3/1999 | Nemser et al. | 210/634 |
| 5,883,177 | A * | 3/1999 | Colaianna et al. | 524/462 |
| 5,902,747 | A * | 5/1999 | Nemser et al. | 435/325 |
| 5,914,154 | A * | 6/1999 | Nemser | 427/245 |
| 5,962,612 | A * | 10/1999 | Takakura et al. | 526/249 |
| 6,040,419 | A * | 3/2000 | Drysdale et al. | 528/408 |
| 6,221,247 | B1 * | 4/2001 | Nemser et al. | 210/321.6 |
| 6,299,777 | B1 * | 10/2001 | Bowser | 210/640 |
| 6,402,810 | B1 * | 6/2002 | Mayer et al. | 95/46 |
| 6,406,517 | B1 * | 6/2002 | Avery et al. | 95/45 |
| 6,517,725 | B2 * | 2/2003 | Spearman et al. | 210/640 |
| 6,569,341 | B2 * | 5/2003 | Bowser | 210/640 |
| 6,572,679 | B2 * | 6/2003 | Baker et al. | 95/47 |
| 6,723,152 | B2 * | 4/2004 | Bikson et al. | 95/45 |
| 6,755,975 | B2 * | 6/2004 | Vane et al. | 210/640 |
| 6,899,743 | B2 * | 5/2005 | Wijmans et al. | 95/50 |
| 7,479,227 | B2 * | 1/2009 | Da Costa et al. | 210/640 |
| 2001/0025819 | A1 * | 10/2001 | Bowser | 210/640 |
| 2006/0076294 | A1 * | 4/2006 | Sirkar et al. | 210/640 |
| 2007/0031954 | A1 * | 2/2007 | Mairal et al. | 435/161 |
| 2008/0216649 | A1 * | 9/2008 | Huang et al. | 95/50 |

OTHER PUBLICATIONS

Brüschke "State of the Art of Pervaporation Processes in the Chemical Industry" (2001) in Membrane Technology in the Chemical Industry, S. P. Nunes and K. -V Peinemann (Eds.) Wiley-VCH, New York 299 pages, p. 149.

Shao, P. and Huang, R.Y.M., Journal of Membrane Science 287 (2007) 162-179.

Membranes for the dehydration of solvents by pervaporation, Chapman, Peter, D., et al. Journal of Membrane Science 318 (2008) 5-37.

Ho, W. S. W, and Sirkar, K.K., Membrane Handbook, Chapman & Hall, New York, NY, p. 127, (1992).

Baker, Richard W., Membrane Technology and Applications, 2nd ed., John Wiley & Sons, Ltd., Chichester, England, p. 364, (2004).

Seader and Henley, Separation Process Principles, John Wiley (1998), Chapter 14 (Membrane Separations) p. 770.

M. Wesslein, A. Heintz and R. N. Lichtenthaler, Journal of Membrane Science, 51 (1-2),169-179 (1990) p. 172.

D. Shah, D. Bhattacharyya, A. Ghorpade, and W. Mangum, Environmental Progress, 18(1), 21-29 (1999), p. 24.

M. S. Schehlmann, E. Wiedemann and R. N. Lichtenthaler, Journal of Membrane Science, 107 (3), 277-282 (1995), p. 278.

Hogan,P.A., A New Option, Osmotic Distillation, Chem.Eng.Prog. Jul. 1998, pp. 49-61.

* cited by examiner

FIG. 6A
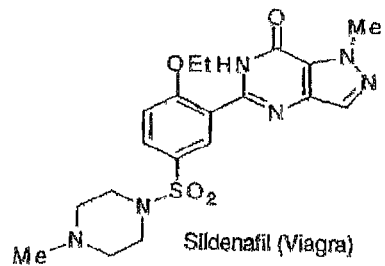
Sildenafil (Viagra)
FIG. 6B
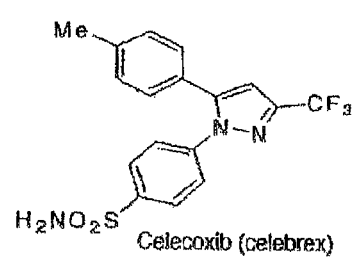
Celecoxib (celebrex)
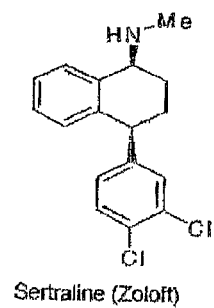
Sertraline (Zoloft)
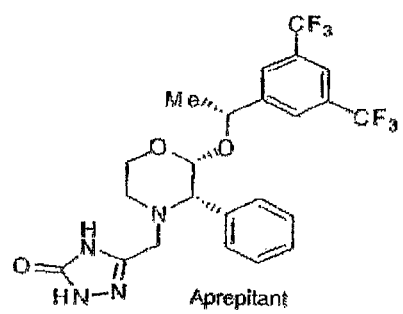
Aprepitant
FIG. 6C
FIG. 6D
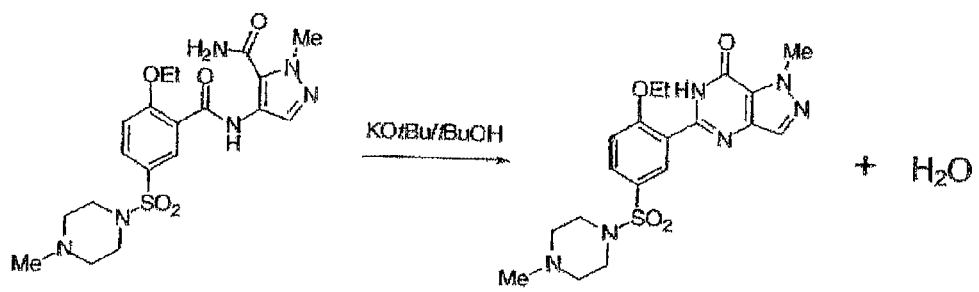
FIG. 7

REMOVAL OF WATER FROM FLUIDS

This application is a continuation of U.S. application Ser. No. 11/924,942, filed Oct. 26, 2007, which claims benefit of U.S. provisional application Ser. No. 60/854,924 filed Oct. 27, 2006.

FIELD OF THE INVENTION

The invention relates to the membrane separation of water and methanol from mixtures, including solutions, with other components. More specifically it pertains to selectively permeating through a perfluoropolymer membrane water and/or methanol from a liquid or vapor feed mixture containing water and/or methanol to provide a retentate product that has significantly lower concentration than the feed of water, methanol or both.

BACKGROUND OF THE INVENTION

In many important industrial chemical operations there exists a need to remove water and/or methanol from a mixture with other chemical components. Traditional methods of removing water or methanol from other components include fractional distillation, thermal evaporation, cryogenic dehydration, and chemical adsorption to name a few. Such methods have drawbacks such as requiring generally complex equipment and systems (e.g., distillation columns with associated pumps, heat exchangers and the like). They typically involve recirculating fluid and solvents in large volume relative to the product volume which adds to material cost as well as contributes to potential waste, safety and environmental protection concerns. Also these processes call for substantial energy input for heating and cooling of circulating fluids that further adds to the cost of operation. Chemical adsorption processes frequently operate cyclically and therefore additionally often utilize oversized and redundant adsorber units so that saturated units can be taken off-line for regeneration without interrupting production.

In some systems it is intrinsically difficult to separate water or methanol from the mixtures and conventional separation techniques are commensurately problematic. Mixtures in which there is a low relative volatility between water or methanol and other compounds or in which water or methanol form azeotropic compositions with the other compounds can be troublesome for traditional distillation methods to separate.

Membrane separation processes for segregating components of mixtures by selectively permeating individual components through a membrane are well known. An excellent recent survey of membrane pervaporation and vapor permeation processes is presented in "Pervaporation Comes of Age" N. Wynn, Chemical Engineering Progress, pp. 66-72, October, 2001. Very basically, in such processes one side of a selectively permeable membrane is contacted with the fluid mixture of components to be separated. A driving force, such as a pressure gradient across the membrane in the case of vapor permeation and concentration gradient in the case of pervaporation, causes preferentially permeating components to migrate through the membrane such that a permeate composition enriched in the faster permeating components develops on the other side of the membrane. A retentate composition on the feed mixture side of the membrane becomes depleted in the faster permeating components. With a vapor feed mixture fluid, this process is generally known as vapor permeation. When the feed fluid is in the liquid state, low pressure, usually vacuum, vaporizes the migrating components on the permeate side. This technique is known as pervaporation.

While offering a valuable alternative to other water and methanol removal methods, existing membrane separation technology also has limitations. Productivity is constrained by the separation characteristics of the membrane. It is a long standing problem in this field that permselective membranes usually have either high transmembrane flux or high selectivity but rarely both. The term "selectivity" means the ratio of permeability through a membrane of a faster permeating species divided by the permeability through the membrane of a slower permeating species. Thus the artisan must often choose a membrane material that sacrifices permeate flow rate to achieve an acceptable selectivity. Moreover many selectively permeable membrane compositions are not able to withstand exposure to temperatures of higher than about 100° C. The membrane deteriorates, weakens and ultimately fails. Hence operation of the separation process is limited to a maximum temperature that is safe for the membrane where a higher temperature would be more productive.

Certain membrane separation methods have been applied to drying of aqueous solutions. Membrane pervaporation of water from ethanol-water solutions of up to about 65 wt. % water using polyvinyl alcohol (PVA) active layer membrane composition is reported to provide a water permeance of less than about $5 \times 10^{-4}$ kmol/m$^2$-hr-mm Hg by D. Shah, D. Bhattacharyya, A. Ghorpade, and W. Mangum, "Pervaporation of pharmaceutical waste streams and synthetic mixtures using water selective membranes" *Environmental Progress*, 18(1), pp. 21-29, 1999, and M. S. Schehlmann, E. Wiedemann and R. N. Lichtenthaler, "Pervaporation and vapor permeation at the azeotropic point or in the vicinity of the LLE boundary phases of organic/aqueous mixtures" *Journal of Membrane Science*, 107(3), pp 277-282, 1995. Vapor permeation using a PVA active layer membrane provides even lower water permeance, i.e., less than about $1 \times 10^{-4}$ kmol/m$^2$-hr-mm Hg (Schehlmann et al. ibid). Others report significantly higher water permeance of as high as about $17 \times 10^{-4}$ kmol/m$^2$-hr-mm Hg using pervaporation with a PVA membrane at concentration of about 90 wt. % water (M. Wesslein, A. Heintz and R. N. Lichtenthaler, "Pervaporation of liquid mixtures through poly(vinyl alcohol) (pva) membranes. I. study of water containing binary systems with complete and partial miscibility" *Journal of Membrane Science*, 51(1-2) pp. 169-179, 1990). However, the water permeance decreases steadily as the concentration of water reduces to about $4 \times 10^{-4}$ kmol/m$^2$-hr-mm Hg at about 20 wt. % water. All of the above studies report that below 10 wt. % water, the permeance of water is below about $2 \times 10^{-4}$ kmol/m$^2$-hr-mm Hg. Consequently conventional membrane separation of water from difficult-to-separate mixtures, while possible, occurs at impractically variable and low flow rates.

It is very desirable to have a membrane separation method of removing water and or methanol from fluid solutions that provides a practically high permeance through the membrane. It would also be beneficial to have such a membrane separation method in which the permeance is relatively uniform over a wide range of water concentration such that the permeance of water through the membrane does not reduce significantly as the concentration of water in the feed declines. It is further desired to have a membrane separation process that provides a substantial water permeance for feed mixtures of water concentration less than about 10 wt. %.

The commercial significance of a practical method to remove water from alcohol, especially ethyl alcohol (i.e., ethanol), has recently become acutely evident. Ethanol is prominently promoted as fuel for internal combustion engines because it is a renewable resource alternative to fossil fuels. It is also finding more immediate use as an additive in so-called reformulated gasoline as a replacement for methyl t-butyl ether (MTBE) to reduce automotive emissions and thus improve ambient air quality. Because ethanol is miscible with water, it easily takes up water from moisture in the air during storage and from liquid water in-leakage during ethanol transfer which are not uncommon in the industry. Water in excess of as little as 0.5 wt. % is recognized to render ethanol unsuitable for fuel applications.

Ethanol is likely to pick up excessive water during distribution via pipeline transfer unless scrupulous precautionary measures are taken. Such measures are beyond current practice standards and are extremely and impracticably difficult to implement in the foreseeable future. Consequently it has been largely necessary to transport dry ethanol in bulk via discrete shipping containers such as cargo tank trailers rather than pipelines. That system can be a major hindrance and costly inconvenience to the distribution of gasoline for automotive and other engine fuels. It would be very valuable to have a method of drying ethanol to less than 0.5 wt. % water for fuel applications and highly desirable for an ethanol drying method that can be adapted for use with a pipeline distribution system Another area of commercial interest in which water contamination of fluid can be a significant impediment to productivity is that of providing hydrocarbon oil of various types for utilities such as mechanical lubrication, power transmission, combustion fuel and the like. Water contamination of oils that lubricates high speed machinery has a great tendency to form a foamy emulsion that drastically reduces lubrication ability and thus can cause premature wear of expensive and difficult to replace equipment. Even low concentrations of water in oil, i.e., in the range below about 2,500 parts per million by weight, can contribute to excessive acidic degradation of the oil, particularly at typically elevated equipment operating temperatures. Such degraded oil also has reduced lubrication capability. Moreover acid produced by the water-promoted degradation of oil can chemically corrode delicate or precision mechanical equipment that the oil is intended to protect. Ester-based hydraulic oil compositions are especially susceptible to acidic degradation because water can react with the esterified oil to form acid which catalyzes the reaction to produce still more acid and further oil degradation.

The water of contaminated oil can be removed by various effective conventional methods. Gross amounts of water are typically removed by coalescing filters and the like. The removal of water to the hundreds of parts per million range usually requires more extensive treatment methods than a simple mechanical filter can provide. However, those methods usually are carried out at oil regeneration disposal facilities which means that the contaminated oil must be removed from the equipment in which it is being used and typically shipped to the regeneration facility location.

Meanwhile the equipment is refilled with fresh oil. This system has a host of drawbacks including equipment downtime for removal and replacement of the contaminated oil, cost of purchase and storing stock of fresh oil to be ready for replacement when needed, handling and storage of contaminated oil waiting for shipment to regeneration, cost of shipping contaminated oil and the price of the service of regenerating or disposing of the contaminated oil. Costs attributed to the contamination and replacement of oil can be very high particularly when large scale equipment such as earthmoving machines, mining equipment, heavy military transportation equipment often located in remote regions are involved.

There is a great need for a method of decontaminating water-containing hydrocarbon oil that is relatively compact, light weight, low power-consuming and simple to operate in remote regions distant from sources of power, utilities and/or waste regeneration and disposal facilities. Such desirable method could operate in the field on wet oil taken from the oil-using equipment to obviate the cost of shipping in fresh oil and shipping out contaminated oil. It is highly desirable to have a method of removing water from oil capable of decontaminating wet hydrocarbon oil to very low concentrations of water in situ. That is, by removing the water during productive equipment operation. It is wanted to have such a water removal method that is small enough to mount on a piece of production equipment and which can draw the power needed for removing water from its host production equipment. For example, it would be helpful to have a hydraulic oil dehydration unit mounted on a bulldozer, surface mine excavator or ocean-crossing vessel. Such drying system would desirably avoid the need to shut down the operating equipment even temporarily by maintaining the concentration of water constantly within safe operational limits rather than waiting for the concentration to build up to an operating maximum value.

Chemical reaction productivity is another field in which removal via membrane of water or methanol has yet to be applied to fuller potential as described in the article by Wynn mentioned above. The article points to esterification, acetalization and ketalization condensations as examples of reactions that are normally limited in ability to provide purer product at higher yield and with greater speed due to equilibrium considerations. Water byproduct present in the reaction mass shifts the equilibrium unfavorably. However, if water could be removed, the equilibrium would shift further toward the product side of the reaction equations. There is a need to remove water from these reaction compositions at high rate to promote productivity of equilibrium reactions. It is also occasionally needed to remove water from chemical reactions in the chemical and pharmaceutical field. In such systems traditional thermally motivated drying is detrimental to the chemicals and/or living organisms involved. There is a need to have a gentler and less thermally severe method of removing water from such reaction systems.

SUMMARY OF THE INVENTION

It has been discovered that selectively permeable perfluoropolymer membranes are highly effective at separating water and/or methanol from solutions with otherwise difficult to separate components. These membranes are particularly effective at removing water from ethanol with very high permeance of at least $9 \times 10^{-4}$ kmol/m$^2$-hr-mm Hg, frequently at least $14 \times 10^{-4}$ kmol/m$^2$-hr-mm Hg and as high as about $17\text{-}19 \times 10^{-4}$ kmol/m$^2$-hr-mm Hg. Surprisingly the permeance remains high from about 90 wt. % to less than about 0.5 wt. % water in ethanol. Perfluoropolymers are thermally stable and may be used in membrane separations at up to about 200° C. The ability to operate the novel membrane separation process at high temperature permits the feed mixture to remain gaseous at higher pressures than possible at lower temperatures. Consequently, vapor permeation can be carried out with a greater transmembrane pressure gradient driving force which further improves water removal performance relative to conventional membrane compositions. Processes for drying with pervaporation utilizing a liquid mixture feed or vapor permeation with a vapor mixture feed can be operated with the perfluoropolymer membranes. A perfluoropolymer membrane method of drying liquid ethanol of water to less than 0.5 wt. % can be used in situ in a suitably modified ethanol transfer pipeline system.

In another aspect this invention provides a method of enhancing the conversion of reversible chemical reactions in which the desired byproduct is water or methanol. The method includes subjecting the reaction mass to contact with a perfluoropolymer membrane under a driving force such that the byproduct selectively permeates across the membrane and out of the reaction mass. This lowers the concentration of a byproduct component which drives the equilibrium state to favor synthesis of the desired product to a greater extent and therefore to achieve more complete conversion of reactants to products than would have occurred had the byproduct not been removed. Because the permeance of water and methanol through the perfluoropolymer membrane is so high while maintaining good selectivity to many useful reaction mass compositions, the method of achieving high conversion is quite effective.

In still another aspect this invention provides a facile method of removing moisture from hydrocarbon oils such as hydraulic fluids. Such fluids are used in machinery to transmit energy, as in fluid couplings and motor transmissions, or to operate piston driven tools, such as cylinders of heavy construction machinery including bulldozers, lifting jacks and cranes to name a few examples. It can be important to machinery performance that the oil remains very dry of water to less than about 50 parts per million. The novel membrane separation process can be used to reduce the moisture content of such oils and fluids to very low concentrations in the tens of parts per million order of magnitude. The novel membrane separation technique has the advantageous feature that it can remove water from oils contaminated with water below about 2,500 ppm where the water is largely dissolved in the oil, or with water above 2,500 ppm where phase separation of a primarily aqueous liquid phase is dispersed with a primarily oily liquid phase.

Accordingly this invention provides a method of removing contaminant selected from the group consisting of water, methanol and a mixture thereof, from a feed composition comprising a product component and said contaminant, the method comprising the steps of (i) providing a membrane separation system comprising at least one membrane comprising a selectively permeable layer comprising a perfluoropolymer, (ii) introducing the feed composition into the membrane separation system and contacting the feed composition in which the contaminant is present at an initial concentration with said membrane, (iii) applying a driving force across said membrane effective to cause permeation of the feed composition through said membrane in which the contaminant transfers through said membrane preferentially relative to the product component, thereby selectively removing contaminant from the feed composition, and (iv) recovering from said membrane separation system a product composition comprising the contaminant at a final concentration substantially lower than the initial concentration.

BRIEF DESCRIPTION OF THE DRAWINGS

FIG. 6A is a diagram of the chemical composition of the representative pharmaceutical Sildenafil the synthesis of which incorporates dehydration steps for which membrane separation according to an embodiment of this invention can be utilized.

FIG. 6B is a diagram of the chemical composition of the representative pharmaceutical Celecoxib the synthesis of which incorporates dehydration steps for which membrane separation according to an embodiment of this invention can be utilized.

FIG. 6C is a diagram of the chemical composition of the representative pharmaceutical Sertraline the synthesis of which incorporates dehydration steps for which membrane separation according to an embodiment of this invention can be utilized.

FIG. 6D is a diagram of the chemical composition of the representative pharmaceutical Aprepitant the synthesis of which incorporates dehydration steps for which membrane separation according to an embodiment of this invention can be utilized.

FIG. 7 is a diagram of the condensation step in the synthesis of the pharmaceutical Sildenafil of FIG. 6A.

DETAILED DESCRIPTION OF THE INVENTION

Figure 1:
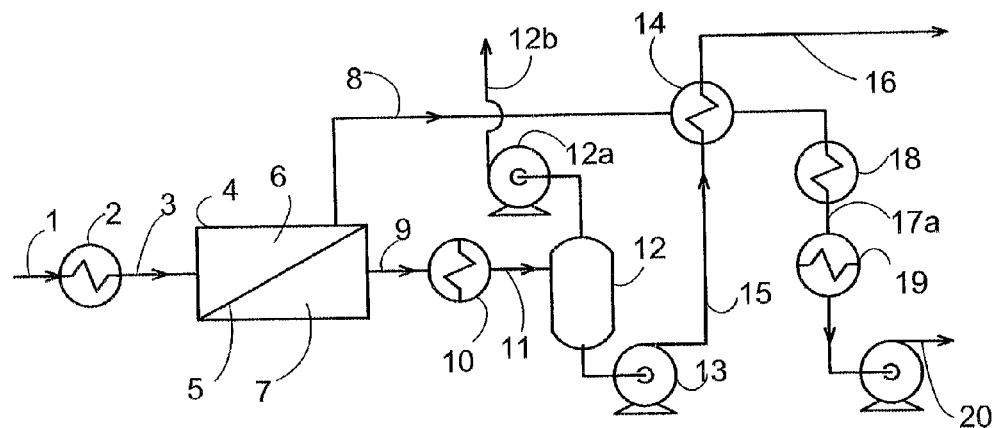
FIG. 1 is a schematic flow diagram of a one stage vapor permeation dryer embodiment of this invention.

Removal of water or methanol from a mixture of water or methanol and other components is occasionally referred to herein by the term "dehydration". This invention is based largely on the discovery that membranes having a nonporous layer of a perfluorinated polymer or copolymer are remarkably well suited to dehydrate mixtures of water and methanol with other components. These membranes have been discovered to exhibit a very high permeance of water and methanol. For example, the permeance to water of these membranes is at least $9 \times 10^{-4}$ kmol/m$^2$-hr-mm Hg, frequently at least $14 \times 10^{-4}$ kmol/m$^2$-hr-mm Hg and as high as about 17-19 $10 \times 10^{-4}$ kmol/m$^2$-hr-mm Hg. Moreover a high permeance can be obtained over a wide range of concentrations of water and methanol in the mixture to be separated. In addition to being high, the permeance remains very constant over the wide range of water and methanol concentration. The permeance is notably high at concentrations of water and methanol below 10 wt. % water or methanol in the mixture. In dehydrating water-ethanol mixtures, the permeance is very high at very low water concentration of about 0.5 wt. %. This is a radical departure from conventional hydrophilic selective membranes used for dehydration such as polyvinyl alcohol ("PVA") compositions which typically have moderate to high permeance at high water concentrations of the mixture being separated but which demonstrate a severe lowering of permeance as the concentration of water in the mixture decreases, especially at below about 10 wt % water.

Perfluorinated polymer or copolymer membranes can be used according to this invention to separate water or methanol from many liquid mixtures or vapor mixtures. With respect to liquid mixtures, the membranes are quite effectively selective for water and methanol with respect to components that are traditionally difficult to separate from water and/or methanol. Thus this invention provides an excellent solution to the problem of removing water and/or methanol from mixtures which are extremely difficult to separate by conventional methods.

Compounds that are traditionally difficult to separate include those that have a low relative volatility with respect to water or methanol and compounds which form azeotropic mixtures with water or methanol. Such components are mainly polar compounds that are miscible with water and/or methanol. Representative difficult-to-separate compounds include butanol, hydrogen fluoride, hydrogen chloride, hydrogen bromide, hydrogen iodide, ethanol, isopropanol, n-propanol, methyl ethyl ketone, tetrahydrofuran, acetone, nitric acid, acetonitrile, acetic acid, ethylene glycol and the like. Representative compounds that each independently form azeotropic mixtures with water and from which the removal of water by separation with a perfluoropolymer membrane should be advantageous are acetonitrile, acrolein, allyl-alcohol, allyl-chloride, benzyl-alcohol, 2-butanol, tert-butanol, butyl-2-ethoxyethanol, butyric-acid, chloral, 1-chloro-2-propanol, chlorobenzene, cyclohexanol, cyclohexylamine, cyclopentanol, diacetone-alcohol, dibutyl-formal, 1,2-dichloroethane, diethyl-ethanolamine, diethylaminoethyl-amine, diethylisopropanol-amine, diisopropyl-amine, dimethyl-acetal, 2,6-dimethyl-morpholine, 1,3-dimethylbutyl-amine, 1,4-dioxane, 1,3-dioxolane, ethanol, 1-ethoxy-2-propanol, 2-ethoxy-ethanol, ethyl-ether, ethyl-morpholine, ethylene-chlorohydrin, ethylene-diamine, formic-acid, glycol-diacetate, hexyl-amine, hydrogen-bromide, hydrogen-chloride, hydrogen-fluoride, hydrogen-iodide, hydrogen-nitrate, isoamyl-alcohol, isopropyl-alcohol, isovaleralaldehyde, 1-methoxy-2-propanol, 2-methoxy-ethanol, 4-methyl-2-pentanone, 2-methyl-2-propanol, methyl-acetate, n-methyl-morpholine, methyl, n-methylbutyl-amine, methylethyl-ketone, methylvinyl-ketone, gamma-picoline, propanol, propionaldehyde, propionic-acid, propyl-acetate, propylene-chlorohydrin, pyridine, and triethyl-amine.

By "low relative volatility" is meant that the relative volatility, a, of the compound with respect to water or methanol lies within the range of about 1.0-1.1. Relative volatility of two components is defined as being equal to the quantity $(y_a/x_a)/(y_b/x_b)$ where $y_a$ is the equilibrium vapor phase mole fraction of the first component, $x_a$ is the equilibrium liquid phase mole fraction of the first component, $y_b$ is the equilibrium vapor phase mole fraction of the second component and $x_b$ is the equilibrium liquid phase mole fraction of the second component. Equilibrium conditions are based on the temperature and pressure of the mixture being separated. An azeotropic mixture is a liquid mixture that boils at a constant composition, i.e. the vapor boiling from the liquid has the same composition as the liquid mixture.

The selective layer polymer should be perfluorinated. The terms "perfluorinated polymer" and "perfluoropolymer" and cognates thereof are used interchangeably herein and are meant to identify a polymeric compound in which all of the substituent positions of carbon in the polymer molecule are fluorine. This provides remarkably good chemical inertness and chemical resistance of the material. Some preferred categories of polymers suitable for use in this invention include, but are not limited to: (i) polymers comprising a perfluorinated dioxole monomer; (ii) polymers comprising a perfluorinated dioxolane monomer; (iii) polymers comprising a perfluorinated alkyl ether monomer; (iv) perfluorinated polyimides; and (v) polymers incorporating tetrafluoroethylene units.

The polymers and copolymers of the selectively permeable membrane can be characterized by a glass transition temperature ("Tg"). The glass transition temperature of a polymer is a phase transition temperature at which the polymer changes from a brittle, vitreous or glassy state to a rubbery or plastic state. Since the polymers used for the selective layer should preferably remain rigid and glassy during operation, they should also have glass transition temperatures comfortably above temperatures to which they are typically exposed during the process. Polymers with glass transition temperature preferably at least about 40° C., more preferably at least about 60° C., still more preferably at least about 100° C. and most preferably at least about 140° C. such as amorphous perfluoropolymers and copolymers are desirable for use in this invention.

None of these are new polymers in themselves. In fact, general polymer formulations embracing those suitable for use in the invention are described in patents dating back from the present day to the 1960s, for example, U.S. Pat. Nos. 3,308,107; 3,488,335; 3,865,845; 4,399,264; 4,431,786; 4,565,855; 4,594,399; 4,754,009; 4,897,457; 4,910,276; 5,021,602; 5,117,272; 5,268,411; 5,498,682; 5,510,406; 5,710,345; 5,883,177; 5,962,612; and 6,040,419.

Preferably the polymer is an amorphous perfluoropolymer. Homo-polymers of tetrafluoroethylene are very chemically inert and, thus, resistant to plasticization. However, at temperatures of interest for membrane gas separations, they tend to be crystalline or semi-crystalline. As a result, the gas permeabilities through the polymer in non-porous form are too low to be of interest for use for the selective layer of a gas-separation membrane. Incorporated into copolymers, however, they enhance chemical resistance. Therefore, combinations of tetrafluoroethylene with other monomer units that result in overall amorphous, yet rigid, perfluorinated, copolymers are particularly preferred.

An example of members of the polymer groups cited above that are ideally suited for practice of the invention, are certain of the dioxole polymers and copolymers of perfluoro-2,2-dimethyl-1,3-dioxole ("PDD") reported in U.S. Pat. No. 5,051,114. These polymers are characterized by very high fractional free volume within the polymer, typically above 0.3. Likewise, these polymers are of low density compared with other crystalline fluoropolymers, such as below about 1.8 g/cm$^3$ and are unusually gas permeable, for instance, exhibiting pure gas permeabilities as high as 1,000 barrers or more for oxygen and as high as 2,000 barrers or more for hydrogen.

In some preferred embodiments, the copolymer is copolymerized PDD and at least one monomer selected from the group consisting of tetrafluoroethylene ("TFE"), perfluoromethyl vinyl ether, and vinylidene fluoride. In other preferred embodiments, the copolymer is a dipolymer of PDD and a complementary amount of TFE, especially such a polymer containing 50-95 mole % of PDD. Examples of dipolymers are described in further detail in U.S. Pat. Nos. 4,754,009 of E. N. Squire, which issued on Jun. 28, 1988; and 4,530,569 of E. N. Squire, which issued on Jul. 23, 1985. Perfluorinated dioxole monomers are disclosed in U.S. Pat. No. 4,565,855 of B. C. Anderson, D. C. England and P. R. Resnick, which issued Jan. 21, 1986. The disclosures of all U.S. patent documents disclosed in this application are hereby incorporated herein by reference.

With respect to amorphous copolymers of PDD, the glass transition temperature will depend on the composition of the specific copolymer of the membrane, especially the amount of TFE or other comonomer that may be present. Examples of $T_g$ are shown in FIG. 1 of the aforementioned U.S. Pat. No. 4,754,009 of E. N. Squire as ranging from about 260° C. for dipolymers with 15% tetrafluoroethylene comonomer down to less than 100° C. for the dipolymers containing at least 60 mole % tetrafluoroethylene. It can be readily appreciated that perfluoro-2,2-dimethyl-1,3-dioxole copolymers according to this invention can be tailored to provide sufficiently high $T_g$ that a membrane of such composition can withstand exposure to steam temperatures. Hence, membranes of this invention can be made steam sterilizable and thereby suitable for various uses requiring sterile materials, especially those involving biological materials, for example pharmaceutical chemicals and materials comprising living cells.

Also importantly for improving dehydration via vapor permeation, membranes of PDD copolymers can function at very high temperatures. The glass transition temperature and thus the softening point of PDD/TFE copolymers depends considerably upon the proportion of TFE comonomer units. Readily available compositions provide glass transition temperatures sufficiently high that the novel membrane process can be operated in the range from about 25° C. to about 200° C. or more. At such temperatures the pressure on the feed side of the membrane can be maintained very high without condensing the feed mixture. Accordingly, the pressure differential across the membrane can be maximized to promote transmembrane flux greater than would be possible had the membrane not been able to stand up to such high temperatures. Preferably, the glass transition temperature of the amorphous PDD copolymer should be at least 115° C.

Other polymers which are suitable for use in accord with this invention are copolymer of TFE and 2,2,4-trifluoro-5-trifluoromethoxy-1,3-dioxole (Hyflon®, Solvay Solexis, Thorofare, N.J.), and polyperfluoro (alkenyl vinyl ether) (Cytop®, Asahi Glass, Japan).

Preferably the active layer, i.e., the selectively permeable portion, of the membrane should be non-porous. In preferred embodiments, the membrane structure comprises an active layer coated on a microporous substrate. The substrate material may, but need not, exhibit low surface energy. The substrate can be any microporous material that allows passage of the permeate. By "microporous" is meant that the structure has pores throughout which form continuous interstices or passageways extending from one side of the substrate through the thickness to the other side. Many conventional, readily available and thus generally inexpensive, microporous membrane substrate materials can be used provided that they are sufficiently compatible with the low surface energy material to accept a coating of the latter. Care should be exercised to assure that the substrate material is chemically compatible with all of the components with which it comes in contact. That is, the substrate should be able to maintain its structural integrity without significant decomposition or deterioration despite enduring contact with these components.

Generally organic or inorganic polymers mixed with organics can be used to prepare the microporous substrate material. Representative organic polymers suitable for the microporous substrates according to the invention include polysulfone; polyethersulfone; polycarbonate; cellulosic polymers, such as regenerated cellulose polymer, cellulose diacetate polymer, cellulose triacetate polymer, cellulose nitrate polymer, and blends of these; polyamide; polyimide; polyetherimide; polyurethane; polyester; polyacrylate and polyalkyl methacrylate, such as polymethyl methacrylate; polyolefin, such as polyethylene and polypropylene; saturated and unsaturated polyvinyls, such as polyvinyl chloride, polyvinyl fluoride, polyvinylidene chloride, polyvinylidene fluoride; polyvinyl alcohol, fluorine substituted polymer such as polytetrafluoroethylene and poly(tetrafluoroethylene-perfluoropropylvinylether); polyetheretherketone; polyacrylonitrile and polyphosphazine. Representative inorganic substrate compositions include zirconia, alumina, titanium dioxide, and $BaTiO_3$ based microporous media and the like.

Methods of forming membranes having a thin active layer coated on microporous substrate are well known as for example disclosed in U.S. Pat. No. 6,221,247 titled "Dioxole coated membrane module for ultrafiltration or microfiltration of aqueous suspensions" of Nemser et al., U.S. Pat. No. 5,914,154 titled "Non-porous gas permeable membrane" of Nemser, and the aforesaid U.S. Pat. No. 5,051,114 titled "Perfluorodioxole membranes" of Nemser et al.

The microporous membrane structure would likely be installed in a module for convenient operation of the dehydration process. The novel water and methanol removal methods can be used with any of the well known module configurations, such as flat sheet, hollow fiber, tubular, spiral wound and vortex devices (also known as "rotating" devices). Other useful configurations include pleated sheet and tube ribbon form. Membrane tubes and tube ribbons are disclosed in U.S. Pat. No. 5,565,166.

Preferably the membrane structure takes the form of a hollow fiber of support material having a thin coating of the active layer one the inner, and/or outer fiber surfaces. Hollow fiber membranes and modules comprising hollow fiber membranes are well known as disclosed by U.S. Pat. Nos. 3,499,062 and 3,536,611, for example.

Because the perfluoropolymer selective membrane utilized in this invention exhibits permeability of water and methanol that is remarkably high and uniform permeability through over a broad range of compositions of mixtures with product components, separations are very productive and practical in which the concentration of the water or methanol in the feed composition can be up to about 99 wt. %. In many utilities the feed composition can contain as little as about 1 wt. % of water and/or methanol and in certain preferred embodiments the initial concentration of water and/or methanol can be below 1 wt. % and as low as about 30 ppm.

Some contemplated embodiments of this invention for which the initial concentration of water or methanol is less than 1 wt. % relate to the drying of water from hydrocarbon composition, oily compounds, such as power transmission oils, transformer oils, fuel oils, lubricating oils, and especially hydraulic fluid transmission oils. Such oils typically have product specifications calling for water content to be less than 1000 ppm, sometimes lower than about 400 ppm and for certain applications lower than about 50 ppm. Frequently hydraulic transmission fluid oil contaminated with water of 2,500 parts per million (ppm) by weight or more is encountered and should be dehydrated for use. When the concentration of water is less than about 2,500 ppm, it is completely dissolved in the oil. That is, there is only a single, liquid phase present. The novel membrane separation process can operate with a feed composition of such fluid. The water sorbs directly from the solution to the membrane, permeates and desorbs in the vapor state on the opposite side of the membrane.

This invention can be directed to water-containing hydrocarbon oils having greater than 2,500 ppm of water. Hydrocarbon oils with such concentrations of water usually form a phase separation. They have an oily phase in which the water is dissolved in oil at up to the saturation concentration of about 2,500 ppm. They also have an aqueous phase predominantly of water that contains a normally very low concentration of oil. If the feed mixture is quiescent, it is sometimes possible to decant at least some of the aqueous phase. The membrane separation process can then operate to remove the water contamination from the oily phase. Sometimes the mixture exists in a state of agitation that renders decantation difficult or incomplete. It is contemplated that the novel membrane separation process can also be applied to remove water directly from the phase-separated mixture. That is, water from the aqueous phase in contact with the membrane and water from the oily phase also simultaneously in contact with the membrane can permeate through the membrane without having to first physically separate the phases. After membrane separation treatment, the water concentration in the product composition can be reduced to less than 1,000 ppm, to less than 400 ppm, to less than less than 50 ppm and to less than 30 ppm, as the practical application might call for. The dehydrated oil will be present in only a single phase.

It is contemplated that membrane separation of water from oil can be very useful as applied to hydraulic fluid of various types of industrial machinery, especially large and/or mobile machinery deployed in locations remote from supplies of fresh, dry hydraulic fluid. Equipment such as cranes, bulldozers, dump trucks and the like are typical of machines that utilize hydraulic fluid in pressure cylinders to move heavy or robotically operating machine parts. Hydraulic fluids and other hydrocarbon oils are also frequently used in engine transmission and drive applications. Such equipment is often mobile and is operated in such remote locations as mines, off-shore oil drilling platforms, and building construction sites in undeveloped parts of the world.

Hydrocarbon oil in the above-mentioned utilities are typically exposed to service conditions that raise the oil temperature above the ambient for substantial durations. Dry hydrocarbon oil in that service usually degrades over time by chemical reaction. The degraded oil has reduced performance and now typically must be exchanged with fresh oil to continue equipment operations. When the hydraulic oil of these machines becomes contaminated with water the susceptibility to degradation increases and the duration between replacements with fresh oil become more frequent. This causes more equipment downtime and lower productivity. Also the water-containing oil must be collected and returned to an appropriate drying facility or be disposed of properly. This invention provides an alternative solution.

It is now been discovered that the service life between exchanges of degraded hydrocarbon oil in hydraulic, transmission and other equipment operation ought to be significantly extendable by removing water from the oil in situ. That is, the oil can be processed to remove water while the equipment in which it is functioning remains in operation. In accord with this invention it is thus possible to provide otherwise conventional hydrocarbon oil-utilizing equipment with an onboard or external local pervaporation membrane separator system capable of drying water-containing oil.

In the novel onboard system, the wet oil is pumped as a liquid through a membrane module in contact with one side of membrane according to this invention. Hydraulic pressure on the liquid contact side contributes to the pressure gradient across the membrane that serves as a driving force for pervaporation. A vacuum can be drawn on the permeate side of the membrane to maximize the pressure gradient and thereby further promote permeation such that water preferentially permeates through the membrane and is removed as a vapor on the permeate side. Optionally a dry sweep gas, for example, of substantially moisture free nitrogen, helium or air can be swept across the permeate side of the membrane to aid permeation. Without wishing to be bound by a particular theory it is thought that sweeping a dry inert gas across the permeate side of the membrane helps in at least two ways. First it lowers the partial pressure of water vapor in the permeate near the membrane which can accelerate desorbtion of water in the membrane into the permeate. Secondly, and especially when there is a microporous support layer on the permeate side of the membrane, the sweep flow can help to clear liquid condensate that can occlude the substrate pores and thereby reduce resistance to transmembrane flux.

Dehumidified ambient air can be used for sweeping. Using a regeneration-capable desiccant is a representative example of a technique for dehumidifying ambient air. Optionally, drawing vacuum and sweeping with a dry gas on the permeate side can be combined. The residual oil being depleted in excess water is collected for reuse. It may be recirculated directly to the operational reservoir of the hydraulic, transmission or other equipment while that equipment continues to operate. In a particular embodiment, the system includes a liquid reservoir for holding the wet oil to be dried and for supplying a pump that feeds the wet oil to the membrane module. The dried oil can be stored in a separate tank from which it can be dispensed to replenish contaminated oil.

Such a system can operate continuously or discontinuously. In the former mode, oil from the equipment is constantly flowing through the module thereby maintaining the water content at a desirable low level. In discontinuous operation mode, oil in service on the equipment is only diverted through the membrane module a fraction of the time, for example, when a sensor detects a pre-selected high concentration of water. Alternatively, the oil can be passed through the membrane on a schedule of predetermined times and durations such that the water content stays at a desired low concentration. The integrated system is thought to be adaptable for use on larger equipment pieces such as large cranes and earthmoving machinery. However, membrane separation can be carried out in highly effective and compact modules utilizing hollow fiber membranes such that integrated and self-contained, onboard hydraulic oil dehydration systems can be adapted to almost any conventional piece of equipment.

The system for drying hydraulic oil described above also features the ability to treat water-contaminated oil from different sources in a central station. That wet oil is accumulated in a reservoir usually positioned at a convenient local site. This ability to recycle water contaminated oils obviates the need to ship away to a distant facility waste oil and to avoid having to over stock fresh replacement oil. Another preferred utility for membrane separation applied to removing moisture from hydrocarbon compounds is the drying of fuel oils such as diesel oil and aircraft fuel, including jet engine fuel.

The present invention can be preferably applied to drying water from water and alcohol solutions in which the alcohol is other than methanol although it can be advantageously applied to separate methanol from water as well. It is especially suited to drying aqueous ethanol solutions of greater than about 1 wt % water and preferably about 3-15 wt. % water. This feed mixture consists essentially of the two main components, namely, water and alcohol, but may also include trace quantities of miscellaneous contaminants which usually aggregate to less than about 1 wt. % of the total of water and alcohol. The novel drying method reduces the water content to substantially less than the concentration in the initial feed mixture, preferably to less than about 0.5 wt %, and more preferably to less than about 0.1 wt %.

A various techniques for drying ethanol-water solutions which are deemed representative of the application of this invention are understood with reference to FIGS. 1-5. In the drawings like elements have the same reference numbers.

FIG. 1 is a schematic flow diagram of a continuous one-stage vapor permeation drying process in which the feed stream 1 is a saturated or nearly saturated vapor state mixture of about 3-15 wt. % water and a complementary amount of ethanol. The novel method functions effectively with an upstream source of a more diluted initial ethanol mixture (i.e., containing greater than 3-15 wt. % water that has been dried to the approximately 3-15 wt. % water concentration by other processes). Feed stream 1 is passed through a heater 2 which increase the temperature and provides a completely vaporized membrane feed stream 3. This feed stream is admitted to a membrane module 4 having a casing the interior of which is effectively subdivided by a membrane into two chambers, namely a feed-retentate chamber 6 and a permeate chamber 7. The membrane module can be any conventional style membrane separator, such as a plate and frame, spiral wound membrane, or hollow fiber module, to identify a few representative examples. A hollow fiber module is preferred.

A hollow fiber module usually has an elongated, typically cylindrical casing and contains a bundle of multiple of hollow fiber membrane elements oriented generally parallel to the casing axis. The ends of the bundles are potted in tube sheet-like bulkheads which form a manifold for a stream of fluid to flow from one end of the module, through the bores of the individual fibers and to the opposite end of the module. The volume of space within the fibers and the end spaces beyond the bulkheads in fluid communication with the fiber bores collectively constitute one chamber. The volume within the casing and surrounding the fibers between the tube sheets defines a second chamber. Cylindrical hollow fiber modules are well known and are available from Compact Membrane Systems, Inc. (Wilmington, Del.).

The membrane 5 includes a preferably thin, nonporous active layer of a perfluorinated polymer or copolymer as disclosed herein. When the feed mixture in the feed-retentate chamber 6 contacts a side of the membrane, water (or methanol as the case may be) preferentially permeates through the membrane to the permeate chamber 7. Operating conditions and membrane physical parameters, such as contact surface area, co-current or counter flow configuration of feed and permeate streams and use of a sweep stream on the permeate side of the membrane, are selected to draw water from the feed mixture such that the retentate stream 8 is depleted in water and has the desired low water concentration. Some ethanol also permeates through the membrane. Hence the permeate stream 9 includes water and a substantial quantity of ethanol. The permeate stream is cooled in a condenser 10 such that the vapor permeate condenses to the liquid state. Condensed liquid permeate 11 flows into a holding tank 12 from which it can be pumped by pump 13 to a primary energy recovery heat exchanger 14. This heat exchanger cools the ethanol enriched product retentate stream 8 with still warm permeate condensate 15. The further cooled condensate 16 is typically recycled to an upstream preliminary dehydration process where gross water will be removed to form the feed mixture 1 for this one-stage vapor permeation dryer system. High purity ethanol product stream 17 is further cooled by exchanger 18 and condenser 19. Cooled liquid final product 20 is pumped to storage or as feed to a subsequent and independent process. Other product cooling schemes from the one illustrated may be used. The illustrated embodiment contemplates that product stream 17 can be hot enough to provide recoverable heat energy in exchanger 18 such that the resulting cooled stream 17a can be condensed to liquid at storage temperature by an inexpensive supply of cooling water in condenser 19.

To achieve practical transmembrane flux so as to provide a greater than 99.5 wt. % pure ethanol stream it is desirable to maximize the pressure differential across the membrane (i.e., feed side pressure-permeate side pressure) while being constrained to feeding the mixture into the module in the vapor state. The pressure differential can be accomplished by drawing a vacuum on the permeate side of the membrane via vacuum pump 12a. Vacuum pump discharge stream 12b typically comprises inert components such as $CO_2$ saturated with water and ethanol vapor. If the flow is small enough to be benign and pursuant to applicable regulations, it can be vented directly to the atmosphere. Otherwise a scrubber such as is often utilized in the process that feeds the membrane separation system can be used to remove organics from the stream prior to venting.

In one contemplated embodiment, the process of FIG. 1 can be operated with the following typical conditions. Feed stream 1 contains about 92 wt. % ethanol and about 8 wt. % water. It is vaporized by heater 2 to about 130° C. and pressurized to about 67 psia by upstream conventional compression means not shown. Vacuum pump 12a draws suction on the permeate chamber 7 to a pressure of about 2 psia (i.e., about 12.7 psig vacuum). The active layer of the membrane can be about 0.5-2 μm thick. The pressure differential drives water preferentially through the membrane such that the retentate vapor stream 8 is purified to about 99.5 wt. % ethanol and enters the primary energy recovery heat exchanger 14 at about 125° C. Vapor permeate wet ethanol stream 9 leaves the membrane module containing about 29 wt. % water under vacuum and also at about 125° C. temperature. After condensing with cooling water, the liquid permeate stream 15 becomes about 46° C. and is able to reheat to about 107° C. in energy recovery exchanger 14 while partially cooling stream 17. After cooling and condensing the liquid product ethanol is pumped away at about 38° C. Operating conditions are not limited to the disclosure of this example. For example, feed temperatures in the range of about 75-135° C. and pressure in the range of about 25-70 psia can be used depending on concentration and degree of separation specifications. Still other temperatures and pressures as brought to bear to optimize the separation can be employed within the limits of the membrane to withstand operating conditions.

Figure 2:
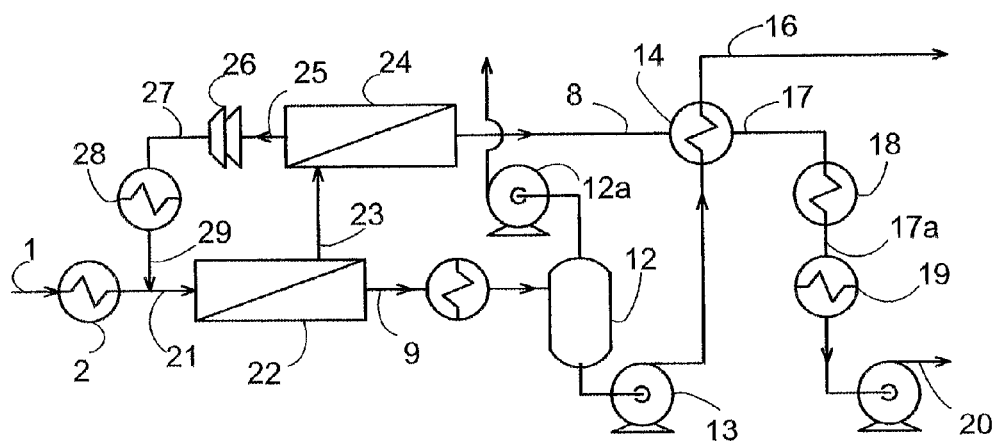
FIG. 2 is a schematic flow diagram of a two step vapor permeation dryer embodiment of this invention.

Another preferred embodiment for a 2-step vapor permeation drying process of ethanol/water solution is illustrated in FIG. 2. Feed stream 1 is vaporized in heater 2 and mixed with a recycled stream 29 of an intermediate ethanol-enriched composition. The blended stream 21 thus has an ethanol composition higher than the raw feed stream 1. Stream 21 is fed to a first step membrane module 22 having a perfluorinated polymer or copolymer active layer permselective membrane according to this invention. The downstream set for processing the first step membrane module permeate stream 9 is the same as described in relation to FIG. 1.

Separation conditions and module physical parameters of first step module 22 are selected such that retentate stream 23 is enriched in ethanol compared to stream 21 however the purity of ethanol is not as high as the amount desired in product stream 17. That is, module 22 can have less membrane contact surface area than that of module 4 (FIG. 1) and/or the flow rate of feed through module 22 could be higher than that through module 4. The first step retentate is further dried in a second step membrane module 24 where it becomes the second step module feed. In the second step module additional water preferentially permeates the membrane reducing the concentration of water in the retentate stream 8 to an acceptable level for dried ethanol. The second step permeate 25 is drawn from the permeate chamber of the second step module by a compressor 26. Suction pressure generated by the compressor provides a pressure gradient between the feed/retentate side and the permeate side of the membrane sufficient to motivate permeation of ethanol and water. Although any conventional compressor or vacuum pump can be used for the second step permeate, a two-stage screw compressor with interstage cooling is preferred to avoid overheating the permeate gas. The compressed permeate gas stream 27 having been heated by the compressor can be cooled in a vapor cooler 28. Preferably the cooling should not condense any of the gas to liquid in order to assure that the combined stream 21 fed to the first step module remains gaseous.

Representative conditions that can be used with the two step vapor permeation system of FIG. 2 are as follows. Fresh feed containing about 92 wt. % ethanol 1 mixes with about 96 wt. % ethanol recycled second stage permeate 29 to form a first step feed at 125° C. and about 55 psia. The first step permeate 9 at 2 psia and about 120° C. has about 71 wt. % ethanol which is condensed and pumped away for re-use. The first step retentate 23 at about 55 psia and 125° C. has ethanol concentration of about 99 wt. %. This stream permeates the second step membrane drawn by a second step permeate chamber pressure of about 5-15 psia to provide the approximately 96 wt. % ethanol recycle stream.

Figure 3:
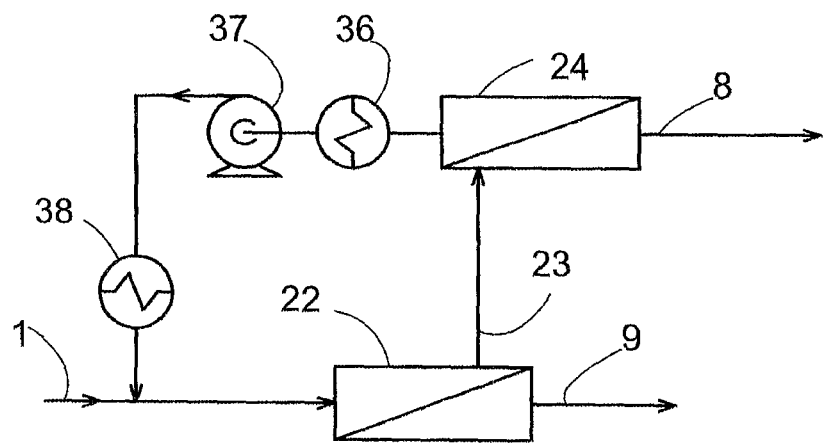
FIG. 3 is a schematic flow diagram of a two step vapor permeation dryer with condense and pump recycle embodiment of this invention.

FIG. 3 illustrates another embodiment representing an alternative to the two step vapor permeation method of FIG. 2. The flow scheme is similar to that of FIG. 2 in that fresh wet ethanol 1 combines with a recycle stream and feeds a first step membrane module 22. The first step permeate vapor 9 is condensed and reused as mentioned above. First step retentate 23 feeds into second step module 24 and further preferential permeation of water takes place to produce about 99.5 wt. % dry product ethanol retentate 8 and an ethanol enriched (relative to feed stream 1), recycle stream. In this embodiment, low pressure of about 2.5 psia on the permeate side of the second step module is generated by condensing the permeate vapor stream in a condensor 36 to about 40° C. The liquid condensate is then pumped to recycle via pump 37 and is vaporized to about 125° C. in evaporator 38.

Figure 4:
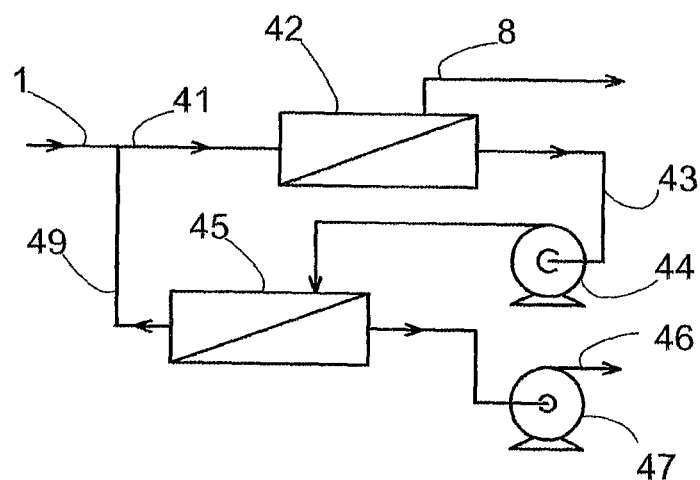
FIG. 4 is a schematic flow diagram of a two stage vapor permeation dryer embodiment of this invention.

Another contemplated embodiment of this invention that implements a two stage vapor permeation drying system is illustrated in FIG. 4. In this process wet ethanol feed 1 is combined with a recycled stream 49 returning from a second stage membrane separation. The combined feed 41 enters a first stage separation module 42 where water preferentially permeates the membrane according to this invention and thereby produces a product retentate stream of dry (about 99.5 wt. %) ethanol 8. The first stage permeate 43 is transferred via blower or compressor 44 which feeds a second stage membrane module 45. Preferentially permeating water in the second stage separation produces a wet ethanol permeate product 46 which is conveyed by unit 47 to reuse or storage as in the previous embodiments. Retentate 49 from the second stage membrane module recycles to the inlet of the first stage module.

Figure 5:
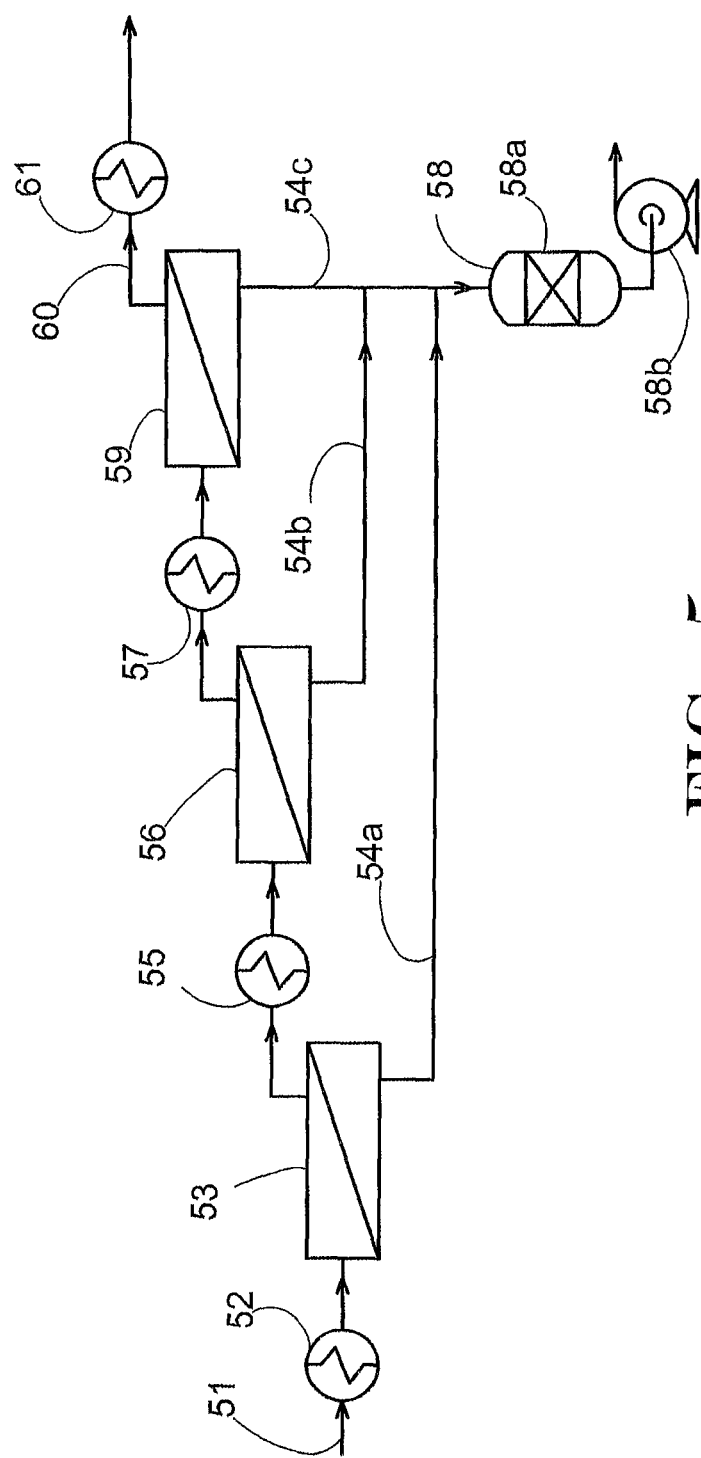
FIG. 5 is a schematic flow diagram of a one step pervaporation dryer with reheaters embodiment of this invention.

Yet another embodiment of this invention applied to the drying of water from alcohol, especially ethanol is shown in FIG. 5. This represents a pervaporation dryer system with intermediate reheaters. This embodiment differs from those represented in FIGS. 1-4 distinctly in that the feed stream 51 is in the liquid state and the fluid in contact with the feed side of the membrane during separation is in the liquid state. On completing passage through the membrane, the migrating components desorb from the membrane into the vapor state, hence the permeate fluid in contact with the membrane and in the permeate chamber is a vapor.

The pervaporation drying embodiment is explained in greater detail as follows. The liquid ethanol/water feed solution having about 3-15 wt. % water is admitted to a first membrane module 53 at desired temperature of ambient to about 120° C. The pressure can be in the range of atmospheric (i.e., about 15 psia) to about 65 psia. If supplied to the pervaporation set by an upstream process that delivers the feed below the desired temperature for separation, an optional preheater 52 can be used to raise the feed to separation temperature. The permeate 54a from the first membrane module is enriched in preferentially permeating water and desorbs as a vapor. The vapor permeate is directed to a collection vessel 58. The liquid retentate from module 53 has a concentration of ethanol higher than the original feed solution. It is fed to a second membrane module 56 while being heated using reheater 55. The retentate cools slightly as a consequence of giving up latent heat of vaporization of the permeate. The reheater heats the retentate up to the desired separation temperature. The reheated liquid feed then contacts the second membrane module 56 and selectively permeates to form a second and also water-enriched, vapor permeate stream 54b. This permeate is also diverted to the collection vessel 58. The second membrane module is still further concentrated in ethanol compared to its corresponding feed composition. It is also slightly cooler than this feed due to loss of the latent heat of vaporization of the second module permeate stream. The second module retentate vapor is reheated to desired membrane separation temperature in heater 57 and is fed to a third membrane module 59. The vaporized, water-enriched permeate 54c from this module joins the other permeate streams and condenses in condenser 58. Combination of the permeate streams provides an ethanol/water composition of about 50 wt. % ethanol. Pressure in the collection vessel can be about 5-15 psia. The collected permeate can be condensed in the vessel with cooling and/or refrigeration condenser 58a so that it can be pumped by pump 58b as a liquid to further processing, storage or disposal. The third membrane retentate 60 has desired dry ethanol product composition, preferably greater than 99.5 wt. % ethanol. It can be optionally heated or cooled as the case may be by heat exchanger 61 to a preselected temperature prior to flowing to a product storage facility or use as a reactant, solvent or the like, in a subsequent process.

Although FIG. 5 depicts a process that uses three modules in series, the actual number of modules will depend upon operating parameters such as the water concentration in the initial feed stream 51, rate of wet feed being dried, effective membrane surface area of the modules, goal product composition, etc. Fewer or greater number of modules can be used. In still a further embodiment of this invention, it is contemplated that the pervaporation process can be applied to drying a wet alcohol, preferably ethanol, in a pipeline. This can be accomplished by using elongated membrane modules, such as hollow fiber membrane modules connected in series to perform the separations. The heating duties can be provided by electrical immersion elements or jacket heaters on the pipe segments upstream and downstream of the modules or by jacket heaters on the modules themselves. Electrical heating is recommended because it can be implemented at remote locations where other forms of heating are not available. However, any type of heating, such as steam condensate heating, can be used when such services are available and convenient to the drying system. Similarly, electrical refrigeration can be used to condense the accumulated permeate that can be drained from the collection vessel from time to time and brought to a centralized post treatment facility for salvage or disposal. Such a system now provides a capability of transporting wet ethanol from a central production facility to a distant fuel formulation blending and distribution facility directly by pipeline equipped with a pervaporation separation unit as described above. Any excess water picked up by the ethanol can be removed as the ethanol passes through the pervaporation unit.

All of the membranes in the modules of the embodiments of FIGS. 1-5 preferably comprise an active layer of an amorphous perfluoropolymer or amorphous perfluorocopolymer. This enables the drying of the initial wet ethanol solution to occur at a fast and highly efficient rate, especially in the later stages of separation where the fluid in contact with the membrane contains much less than about 10 wt. % water.

In a further aspect this invention provides a significantly effective technique for carrying out certain reversible chemical reactions to achieve high conversion of reactants to useful and desired reaction products. For reversible reactions typified by the following equation (I):

$$A+B \leftrightarrow R+S \quad (I)$$

in which A and B are reactant species and R and S are product species, the equation for the rate of formation of the products from reactants, r, is determined by the following equation (II):

$$r = k_1 C_A C_B - k_2 C_R C_S \quad (II)$$

in which $k_1$ and $k_2$ are constants and $C_A$, $C_B$, $C_R$ and $C_S$ are the concentrations in the reaction mass of components A, B, R and S, respectively. As the concentrations of products build up, the reverse reaction rate quantity $k_2 C_R C_S$ increases and the overall rate of reaction, r, reduces. Reaction (I) can be driven farther toward an equilibrium state that favors formation of products by lowering the concentrations of the products in the reaction mass. This is accomplished by removing one or more of the products.

In many reversible reaction systems water or methanol is a byproduct. Thus by removing water or methanol from the reaction mass as the case may be, equilibrium can be driven toward product formation and the rate of producing desired product species is increased. According to the present invention, byproduct is removed by contacting a side of a selectively permeable membrane having an active layer of amorphous perfluoropolymer with the reaction mass under conditions which favor the transmission of the byproduct through the membrane. Where the reaction mass is in the gaseous state this membrane removal can be achieved by vapor permeation. Where the reaction mass is in the liquid state, membrane removal occurs by pervaporation.

Some broad categories of reversible reactions in which the novel removal of water or methanol by pervaporation or vapor permeation using a perfluoropolymer active layer selective membrane are listed in the following Table 1.

TABLE 1

| Reactant A | Reactant B | Product | Examples of Product |
|---|---|---|---|
| Acid | Alcohol | Ester | $C_6H_5COOC_2H_5$ |
| Ketone | Alcohol | Ketal | $CH_3CH_2CH(OC_2H_5)_2$ |
| Aldehyde | Amine | Imine | $CH_3CH=NCH_3$ |
| Ketone | Amine | Imine | $(CH_3)_2C=NCH_3$ |

Removing byproduct from reaction masses of reactions such as those exemplified in Table 1 is generally much more energy efficient in the novel membrane separation process than conventional separation processes. The energy for such membrane separations is utilized to vaporize the water or methanol permeating through the membrane and to produce a driving force for permeation across the membrane. A pressure gradient driving force can be obtained by pressurizing the mass on the feed side of the membrane and/or by drawing a vacuum on the permeate side. The novel removal technique can be retrofitted into existing unit operations without significant additional modification. Not uncommonly, the reaction mass in reversible reaction systems is pressurized and therefore, the need to compress the feed to the membrane can be negligible.

In addition to energy savings, the novel membrane technique for water/methanol removal advantageously obviates the drawbacks of traditional removal methods. Azeotropic distillation is a conventional dehydration technique. The reaction mass is mixed with an entrainer compound that forms an azeotropic composition with water. The azeotropic composition is removed from the reaction mass, typically by distillation allowing the reaction to proceed toward greater conversion of reactants. The azeotrope is then processed to recover the entrainer compound. Operation of the azeotropic distillation unit operation is energy intensive and is also inconvenient due to the need to handle large volumes of materials not directly involved in the synthesis process, namely, the entrainer. The novel membrane water separation eliminates the need to treat and dispose of waste entrainers.

Membrane separation according to this invention also presents advantages over molecular sieve water removal that is customarily used in many reversible reaction product synthesis systems. In the molecular sieve technique fine particles of molecular sieve material are dispersed in the reaction mass. The sieve particles adsorb water and then are removed from the reaction mass. Physical separation of the wet sieve particles and desorbing the water to regenerate them makes molecular sieve water removal inconvenient and unproductive.

This membrane separation technique for removing water from a reversible reaction mass can be applied in the field of pharmaceutical syntheses which include condensation or dehydration steps. Representative examples of pharmaceuticals in this class are Sildenafil, Celecoxib, Sertraline and Aprepitant as seen in FIG. 6. The condensation step which produces a mole of water for each mole of product in the process for synthesizing the pharmaceutical Sildenafil is shown in FIG. 7.

In another particularly preferred embodiment of this invention a pervaporation separation employing a perfluoropolymer selectively permeable membrane can be used to remove excess water present during enzyme catalyzed reactions in non-aqueous media. Although presence of some water can raise enzyme activity in certain systems, increased water concentrations can be detrimental to enzyme activity. Water is known to adversely cause enzyme agglomeration and decrease of enzyme stability when water is also a byproduct of enzyme-catalyzed reactions in organic media. When water is a byproduct its presence in large amount can also unfavorably shift equilibrium away from formation of products as mentioned above. Therefore it is often desirable to control the concentration of water to an optimized range in non-aqueous enzyme catalyzed reactions.

Removal of excess water can be achieved by contacting the enzyme catalyzed reaction mass with the perfluoropolymer membrane under pervaporation conditions. Due to their high fluorine content, these membranes are generally very resistant to degradation by organic solvents that are frequently used in enzyme catalyzed reactions as well as having high permeability to water. An example of an enzyme catalyzed reaction in non-aqueous medium to which this invention can be well applied is the lipase catalyzed esterification of caprylic acid and n-butanol that is carried out in cyclohexane as described in *Enzymatic esterification reaction in organic media with continuous water stripping; effect of water content on reactor performance and enzyme agglomeration*, J. C. Jeong and S. B. Lee, Biotechnology Techniques Vol. 11, No. 12, Chapman and Hall, 1997, pp. 853-858.

In context of the separation of byproduct from reversible reactions the above discussions has concentrated upon disclosure of water as the byproduct being removed. The novel process which uses preferably nonporous active layers of amorphous perfluoropolymer for the pervaporation and vapor permeation membrane can also be used to separate methanol by product from higher alcohol-containing reaction masses.

In addition to pervaporation and vapor permeation, perfluoropolymer membranes can be used in the novel membrane processes for removing water and methanol by osmotic distillation. In osmotic distillation, the driving force for permation through the membrane is provided by a gradient of concentration of the transferring component, i.e., water or methanol. This gradient is created by supplying to the permeate side of the membrane a diluent composition that accepts the migrating component emerging from the membrane and carries it away, thereby keeping the concentration of the migrating component very low. Osmotic distillation is discussed in U.S. Pat. Nos. 6,299,777 and 6,569,341 of J. Bowser assigned to CMS Technology Holdings, Inc., the full disclosures of which are hereby incorporated by reference herein.

EXAMPLES

This invention is now illustrated by examples of certain representative embodiments thereof, wherein all parts, proportions and percentages are by weight unless otherwise indicated.

Comparative Example 1

Acid Formation in Wet Phosphate Ester Hydraulic Oil

Water content of phosphate ester hydraulic oil (Fyrquel® 220, Supresta, Ardsley, N.Y.) was analyzed with a Karl Fisher model DL18 titrator using Aquastar® CombiSolvent Oils & Fats and CombiTitrant 2 as the solvent and titrant analytical reagents. Water was added to provide a water concentration of 2000 ppm. A sealed flask containing 200 mL of this hydraulic oil was placed in an oven maintained at 85° C. and the oil was sampled on various days over the subsequent 23 day period. The samples were analyzed for total acid number ("TAN" units of mg KOH/g) by dissolving 2-10 g in 60 mL of 500:495:5 toluene/2-propanol/water solvent and titrating against KOH in 2-propanol. A Mettler Toledo model DL12 titrator with DG113-SC electrode was used for the TAN titrations. Resulting data are plotted as TAN vs. number of total aging days "D" in FIG. 8 and labeled "CE 1".

Example 2

Acid Formation in Wet Phosphate Ester Hydraulic Oil Dried by Membrane Separation A membrane module having a flat sheet composite membrane of a copolymer of 87 mol % perfluoro-2,2-dimethyl-1,3-dioxole and 13 mol % tetrafluoroethylene ("TAF-2400") on a porous substrate of expanded polytetra-fluoroethylene ("ePTFE") was utilized. The thickness of the TAF-2400 layer of the membrane was about 6 μm and effective area of the membrane surface was 1300 cm2.

The membrane module was installed in a testing apparatus shown schematically in FIG. 11 and operated as follows. A flask 121 containing 1250 mL Fyrquel 220 oil 126 was placed in a heated water bath 122 maintained at 90° C. and effective to control the temperature of the oil at 85° C. A stirrer, not shown, was used to agitate the oil in the flask. The oil was continuously recirculated by a gear pump 123 through transfer line 128, membrane module 129 and return line 131. Thus the liquid oil circulating at 64 mL/min. and pressure of 1.56 kg/cm$^2$ was in contact with one side of the membrane 130 within the module. Suction was drawn on the permeate side of the membrane 130 via line 137 and vacuum pump 133. Cold trap 132 with liquid nitrogen collected water vapor. Nitrogen gas 134 flowing countercurrent to the direction of oil flow through the module was admitted on the permeate side to promote sweeping across the membrane surface. Samples of the hydraulic oil were taken from the circulating liquid at discharge of pump 123 during the experiment.

The following "semi-continuous" protocol for processing the oil subject to drying was employed. At the start of each day that a sample was taken, water was added to the oil in the flask to increase the water concentration to 3000 ppm. The oil was then circulated through the membrane for 4 hours. Due to the water removal effect of the membrane, water concentration dropped substantially. Water was then added to re-initialize the concentration to 3000 ppm and circulation continued for an additional 2-4 hours. The circulation pump 123 was then shut off. On occasions when the recirculation through the membrane module was scheduled to resume within 24 hours, water was again added in amount effective to raise water concentration of the dried oil in the flask to 1000 ppm. This oil was held in an oven at 85° C. until the next day of sampling at which time the water content was increased to 3000 ppm concentration and the above-described recirculation through the membrane was repeated. On occasions when the recirculation through the membrane was scheduled to resume more than 24 hours later, after stopping the circulation pump 123 water was added to the oil to increase the water concentration to 500 ppm and this oil was held in an oven at 85° C. until the next sampling day at which time the water content was increased to 3000 ppm before restarting circulation. Samples taken during the test were analyzed for TAN as in Comp. Ex. 1 and results ("EX2") are presented in FIG. 8.

Ester-based hydraulic fluids are typically formed by reaction of an organic acid with an alcohol. The reaction is reversible such that in the presence of water, the oil can revert to parent acid and alcohol. Heat accelerates this hydrolysis to produce acid and acid formed by hydrolysis catalyzes further hydrolysis and still more acid formation.

Figure 8:
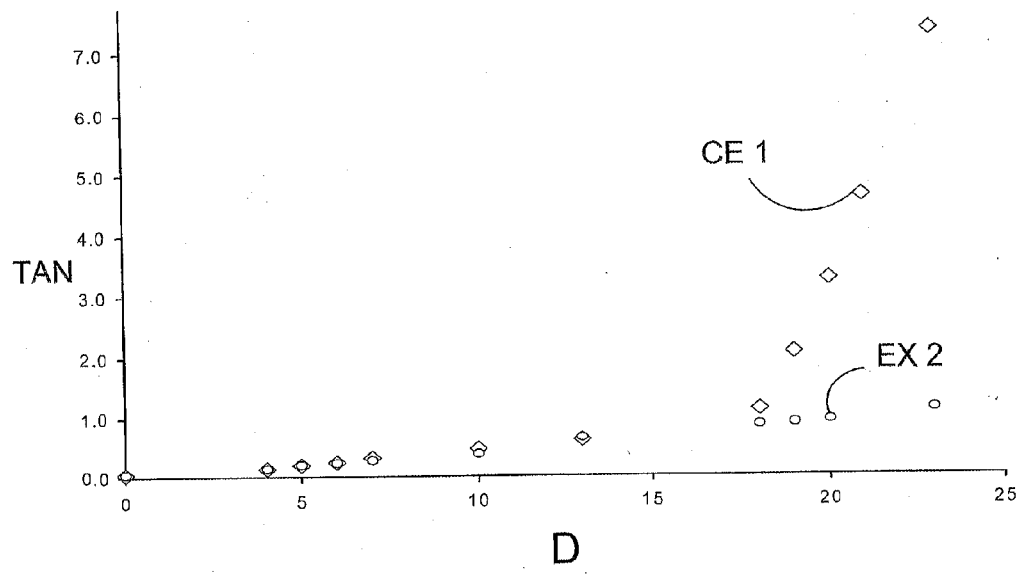
FIG. 8 is a plot of total acid number (mg KOH/g) as a function of time in days of exposure of hydrocarbon oil samples treated in accord with examples disclosed herein below.

FIG. 8 shows that the hydraulic oil left untreated degraded as seen by gradual acid build up until the 18$^{th}$ day after which degradation increased rapidly. The hydraulic oil processed through the membrane also demonstrated gradual acid development during the first 18 days at a rate approximately equivalent to the untreated oil. However, after the 18$^{th}$ day and until termination of the test on the 23$^{rd}$ day, the TAN values of the treated oil continued to increase only at the same gradual rate as earlier and ended up with much lower apparent degradation than CE1.

Comparative Example 3

Acid Formation in Wet Biodegradable Hydraulic Oil

The procedure of Comp. Ex. 1 was repeated except that the oil used was a biodegradable hydraulic oil (Carelube HTG, BP Lubricants, Wayne, N.J.) to which water was added to a concentration of 5,000 ppm. The wet oil was aged within a sealed flask in an oven at 80° C. Samples taken during the aging period were analyzed for total acid number and results labeled "CE 3" are plotted as TAN vs. total number of aging days "D" in FIG. 14.

Example 4

Acid Formation in Wet Biodegradable Hydraulic Oil Dried by Membrane Separation

Figure 11:
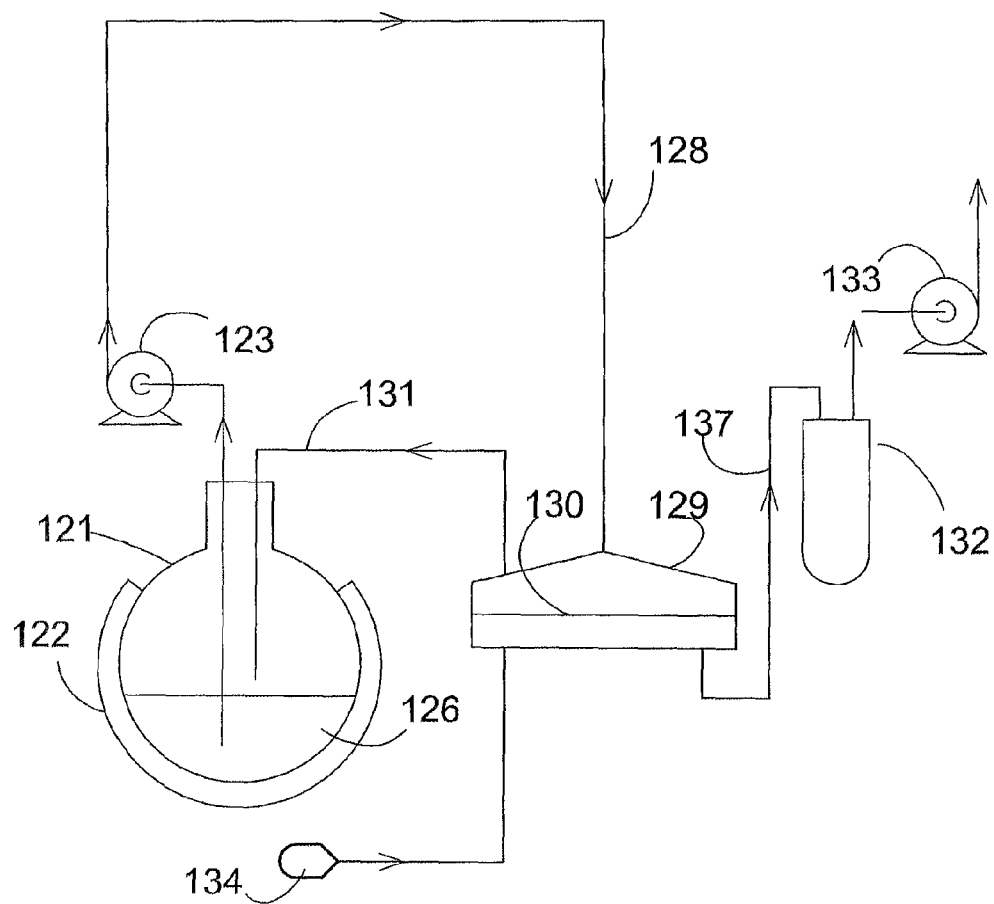
FIG. 11 is a schematic flow diagram of an apparatus used for conducting examples related to acid development in hydrocarbon oil samples as disclosed herein below.

Using the apparatus of FIG. 11 as described above, 12 liters of the biodegradable hydraulic oil of Comp. Ex. 3 was initially placed in the heated flask 121 with amount of water effective to achieve a 5,000 ppm water concentration. The oil was recirculated through the membrane module continuously for 26 days while maintaining temperature at 80° C. Once on each of days 3, 7, 9, 15 and 21, water was added to restore water concentration to 5,000 ppm because water concentration had decreased by permeation. Samples for total acid number were taken during the testing period and the results labeled "EX 4" are plotted as a function of duration in days "D" in FIG. 14.

Figure 14:
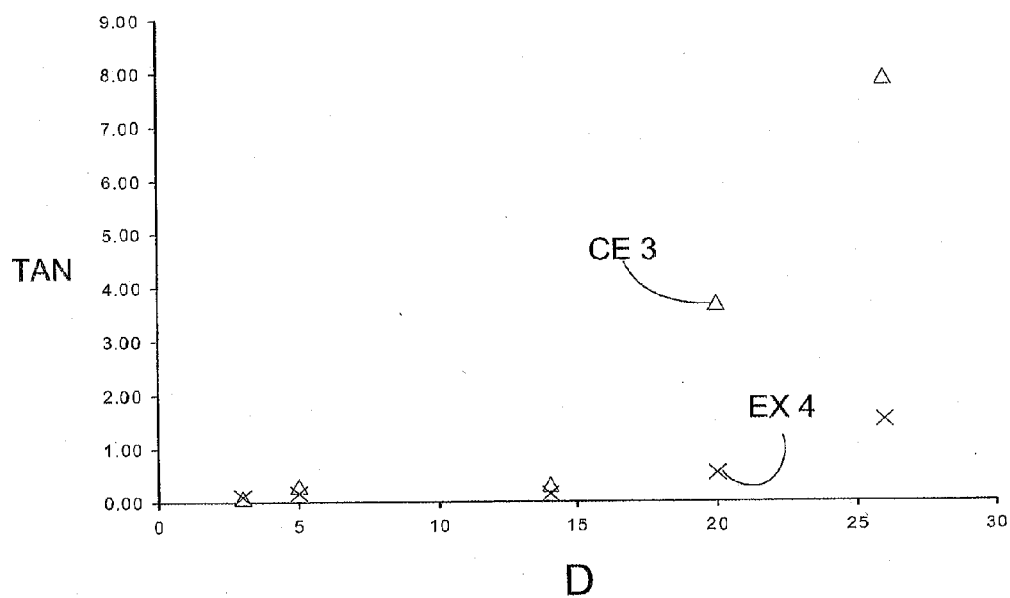
FIG. 14 is a plot of total acid number (mg KOH/g) as a function of time in days of exposure of hydrocarbon oil samples treated in accord with examples disclosed herein below.

Data of FIG. 14 show that without removal of water through the membrane acid developed gradually for the first 14 days then increased rapidly to a high TAN value at the 26$^{th}$ day. In contrast, the membrane treated oil continued to develop acid at a gradual pace for the same 14 day period and only increased to about 1.5 mg KOH/g TAN value on the 26$^{th}$ day.

Example 5

Water Removal from Wet Hydraulic Oil by Membrane Separation

Figure 15:
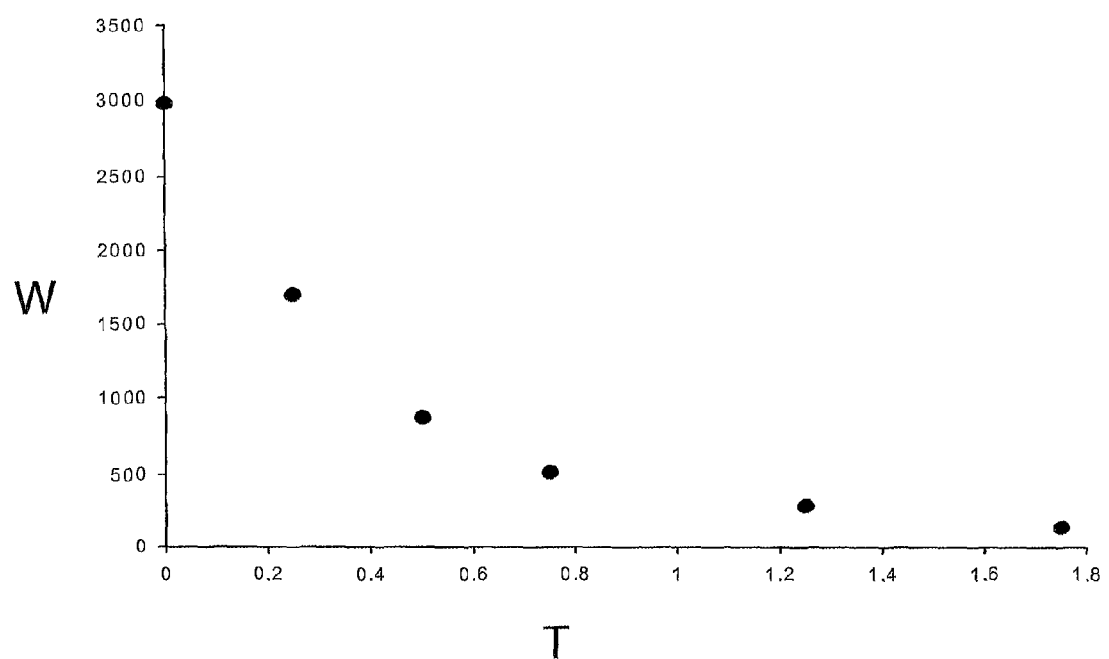
FIG. 15 is a plot of water concentration (parts per million by weight) as a function of time in hours of exposure of hydraulic oil dried by membrane separation in accord with an example disclosed herein below.

The procedure of Ex. 2 was repeated except that the hydraulic oil initially wet to about 3,000 ppm water concentration was recirculated through the membrane module for 2 h with samples drawn periodically and analyzed for water content. The resulting data is presented in FIG. 15 as a plot of ppm water concentration "W" vs. hours of recirculation time "T". The figure shows that the membrane was very effective at removing more than 95% of the initial 2,982 ppm of water from the oil in less than 2 hours of permeation to a concentration of 138 ppm water.

Examples 6-10

Pervaporation of Ethanol-Water Solution

Figure 9:
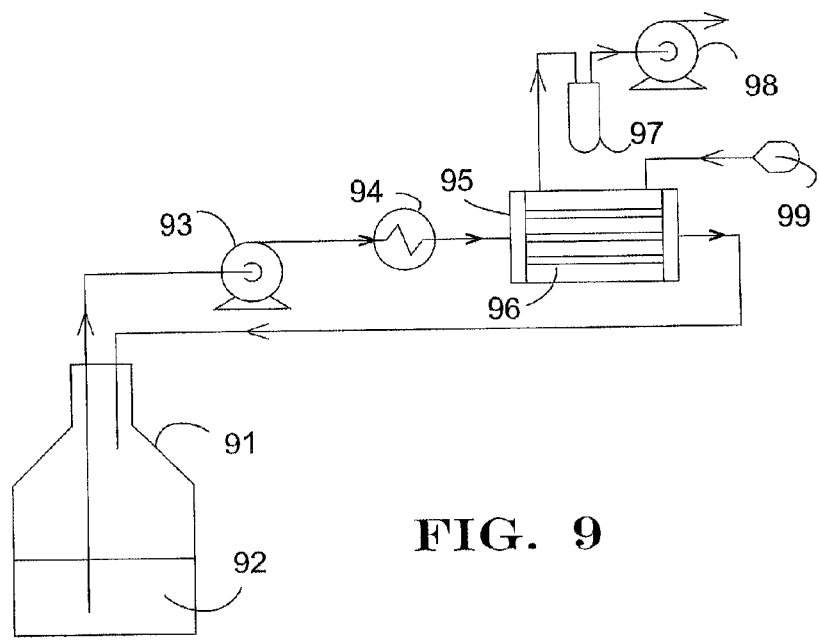
FIG. 9 is a schematic flow diagram of an apparatus used for conducting pervaporation examples disclosed herein below.

An apparatus for pervaporation was set up as shown in FIG. 9. For Example 6, 250 mL of an 85% ethanol/15% distilled water solution 92 was placed into a glass reservoir 91. The solution was mildly stirred with a magnetic stirring bar. Liquid was continuously pumped from the reservoir by pump 93 through a heater 94 into a feed port of a hollow fiber membrane module 95. The heater raised the liquid temperature to a controlled temperature for separation. The module was positioned in a heating bath to assure that permeation occurred at the appropriate temperature. The module contained 3 12 inch long hollow fibers 96 of polyvinylidene fluoride which were each coated on the interior surface with a 4 µm thickness nonporous layer of copolymer of 65 mol % perfluoro-2,2-dimethyl-1,3-dioxole and 35 mol % tetrafluoroethylene ("TAF-1600"). The fibers had 0.7 mm inner diameter and 1.3 mm outer diameter. Effective membrane transfer area was 20.1 cm$^2$. The feed flowed in parallel through the lumina of the fibers to a retentate port of the module at the opposite end of the fibers from the feed port. From the retentate port the liquid returned to the reservoir 91. Suction was drawn on the shell side of the membrane module by vacuum pump 98 through an intervening liquid nitrogen chilled cold trap 97. Permeating components passed through the fibers to the shell side in the vapor state due to the suction pressure. Permeate vapors were condensed in the cold trap. A flow of helium gas 99 was swept through the shell side of the module and discharged from the vacuum pump to atmosphere with other noncondensables.

The liquid was recirculated through the module for 180 minutes. A 0.5 mL sample of the feed liquid was taken at 30 minute intervals. At completion of the test the cold trap was thawed, and the weight and composition of the permeate were determined.

In Examples 7-10, the procedure of Ex. 6 was repeated except that the initial feed composition of the solution and the sweep gas were changed as indicated in Table 2. The data show that water permeability remained steady in the range of about 3500-5000 barrers over the range of 4-85% water in the feed solution. For Comparative Example 11, the pervaporation process was repeated with a feed of 100% distilled water.

TABLE 2

|  | Ex. 6 | Ex. 7 | Ex. 8 | Ex. 9 | Ex. 10 | Comp Ex. 11 |
|---|---|---|---|---|---|---|
| Feed Ethanol, wt % | 15 | 55 | 74 | 95 | 96 | 0 |
| Feed Water, wt % | 85 | 45 | 26 | 5 | 4 | 100 |
| Feed Temperature, ° C. | 60 | 56.5 | 60 | 54.9 | 60 | 60 |
| Feed Pressure, psia | 23.7 | 34 | 23.7 | 18.2 | 22.2 | 24.7 |
| Feed flow, mL/min. | 52 | 50 | 60 | 53 | 60 | 60 |
| Retentate Pressure, psia | 14.7 | 15.2 | 15.2 | 15.5 | 14.7 | 14.7 |
| Retentate Temperature, ° C. | 60 | 63.2 | 60 | 62 | 60 | 60 |

TABLE 2-continued

|  | Ex. 6 | Ex. 7 | Ex. 8 | Ex. 9 | Ex. 10 | Comp Ex. 11 |
|---|---|---|---|---|---|---|
| Permeate Pressure, in Hg abs. | nil | 3.01 | .91 | .41 | 1.91 | nil |
| Sweep Pressure, in Hg abs. | nil | 3.84 | .91 | 1.58 | 1.91 | nil |
| Sweep component | He | $N_2$ | He | $N_2$ | He | He |
| Sweep flow, std. cm$^3$/min. | 50 | 50 | 50 | 50 | 50 | 50 |
| Permeate Ethanol, wt. % | 5 | 25 | 20 | 45 | 54 | 0 |
| Permeate Water, wt. % | 95 | 75 | 80 | 55 | 46 | 100 |
| Permeate mass, g | 2.67 | 2.3 | 2.48 | 1.24 | 1.07 | 2.42 |
| Water Permeability, Barrer | 4018 | 3875 | 4268 | 4977 | 3517 | 3613 |
| Water Flux, [mol/(cm$^2$-sec)]/10$^{-7}$ | 6.51 | 4.43 | 5.16 | 1.75 | 1.26 | 6.19 |
| Ethanol Flux, [mol/(cm$^2$-sec)]/10$^{-7}$ | 0.126 | 0.569 | 0.454 | 0.557 | 0.579 | n/a |

Examples 12-14

Vapor Permeation of Ethanol-Water Solution

Figure 10:
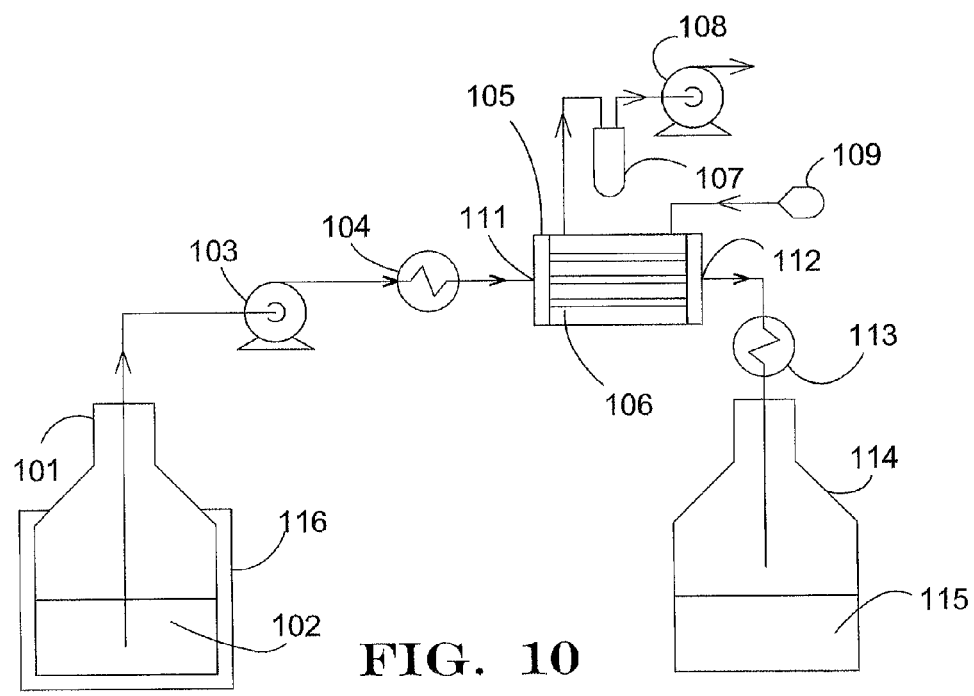
FIG. 10 is a schematic flow diagram of an apparatus used for conducting vapor permeation examples disclosed herein below.

An apparatus for testing vapor permeation was set up as shown in FIG. 10. For Example 12, 400 mL of an 96% ethanol/4% distilled water solution 102 was placed into a glass reservoir 101 positioned within a heating bath 111 of ethylene glycol and water. The solution was mildly stirred with a magnetic stifling bar. Liquid was continuously pumped from the reservoir by pump 103 through a heater 104 into a feed port of a hollow fiber membrane module 105. The heater raised the temperature of the warmed liquid from the reservoir to a controlled temperature effective to vaporize the feed prior to entering the module. The module was positioned in the heating bath to assure that permeation occurred at the appropriate temperature. The module contained three 12 inch long hollow fibers 106 of polyvinylidene fluoride which were each coated on the interior surface with a 1.8 µm thickness nonporous layer of TAF-1600 copolymer. The fibers had 0.7 mm inner diameter and 1.3 mm outer diameter. Effective membrane transfer area was 20.1 cm$^2$. The feed vapor flowed in parallel through the lumina of the fibers to a retentate port 112 of the module at the opposite end of the fibers from the feed port 111. From the retentate port the vapor flowed through a chiller 113, condensed to a liquid 115 and was collected in glass receiving vessel 114. Suction was drawn on the shell side of the membrane module by vacuum pump 108 through an intervening liquid nitrogen chilled cold trap 107. Permeating components passed through the fibers to the shell side. Permeate vapors were condensed in the cold trap. A flow of helium gas 109 was swept through the shell side of the module and discharged from the vacuum pump to atmosphere with other noncondensables.

The liquid was processed through the module for 60 minutes. At completion of the test the cold trap was thawed, and the weight and composition of the permeate were determined.

In Examples 13 and 14, the procedure of Ex. 12 was repeated except that the initial feed composition of the solution was changed as indicated in Table 3. For Comparative Example 15, the vapor permeation process was repeated with a feed of 100% distilled water.

TABLE 3

|  | Ex. 12 | Ex. 13 | Ex. 14 | Comp. Ex. 15 |
|---|---|---|---|---|
| Liquid Feed Ethanol, wt % | 74 | 85 | 96 | 0 |
| Liquid Feed Water, wt % | 26 | 15 | 4 | 100 |
| Feed Temperature, ° C. | 97.2 | 89.8 | 100 | 104 |
| Feed Pressure, psia | 15.7 | 17.7 | 5 | 15.7 |
| Feed flow, mL/min. | 5 | 5 | 6.5 | 5 |
| Retentate Pressure, psia | 15.2 | 15.2 | .5 | 14.7 |
| Permeate Pressure, in Hg abs. | 3.91 | 0.91 | 1.91 | 0.91 |
| Sweep component | He | He | He | He |
| Sweep flow, std. cm$^3$/min. | 50 | 50 | 50 | 50 |
| Permeate Ethanol, wt % | 15 | 16 | 65 | 0 |
| Permeate Water, wt % | 85 | 84 | 35 | 100 |
| Permeate mass, g | 3.38 | 1.96 | 2.15 | 5.68 |
| Water Permeability, Barrer | 2572 | 2117 | 2196 | 2273 |
| Water/Ethanol selectivity | 17.4 | 33 | 10 |  |
| Water Flux, [mol/(cm$^2$-sec)]/10$^{-7}$ | 22.0 | 12.6 | 5.72 | 43.6 |
| Ethanol Flux, [mol/(cm$^2$-sec)]/10$^{-7}$ | 1.55 | 0.95 | 4.22 | n/a |

Examples 16-17

Pervaporation of Methanol-Water Solution

For Example 16, the procedure of Ex. 6 was repeated except that the liquid initially placed in the reservoir was 5 wt % water and 95% methanol and the thickness of the TAF-1600 coating of the hollow fibers was 2.4 µm. The procedure of Example 16 was repeated in Example 17. Conditions and results are presented in Table 4, below.

TABLE 4

|  | Ex. 16 | Ex. 17 |
|---|---|---|
| Liquid Feed Methanol, wt % | 95 | 95 |
| Liquid Feed Water, wt % | 5 | 5 |
| Feed Temperature, ° C. | 61 | 61 |
| Feed Pressure, psia | 22.6 | 22.7 |
| Feed flow, mL/min. | 29 | 29 |
| Retentate Pressure, psia | 15.7 | 15.2 |
| Permeate Pressure, in Hg abs. | 5.97 | 7.74 |
| Sweep Pressure, in Hg abs. | 5.91 | 7.91 |
| Sweep component | He | He |
| Sweep flow, std. cm$^3$/min. | 50 | 50 |
| Permeate Methanol, wt % | 91 | 89 |
| Permeate Water, wt % | 9 | 11 |
| Permeate mass, g | 5.3 | 4.82 |
| Water Permeability, Barrer | 3665 | 4663 |
| Water Flux, [mol/(cm$^2$-sec)]/10$^{-7}$ | 1.18 | 1.33 |
| Methanol Flux, [mol/(cm$^2$-sec)]/10$^{-7}$ | 6.96 | 6.18 |

Example 18

Vapor Permeation of Isopropyl Alcohol-Water Solution

The procedure of Example 12 was repeated except that a flat sheet membrane with an active layer of TAF-1600 copolymer was used in place of the hollow fiber membrane and except that the initial liquid solution 102 composition was 34 wt % water and 66 wt % isopropyl alcohol. The membrane had a surface area of 464 cm². At conclusion of this experiment the water/isopropyl alcohol selectivity was determined to be 41.

Examples 19

Vapor Permeation of Methanol-Water Solution

The procedure of Example 12 was repeated except that a flat sheet membrane with an active layer of TAF-1600 copolymer was used in place of the hollow fiber membrane and except that the initial liquid solution 92 composition was 5 wt % water and 95 wt % methanol. The membrane had a surface area of 464 cm$^{-2}$. At conclusion of this experiment the water/methanol selectivity was determined to be 6.

Examples 20-24 and Comparative Example 25

Thin Membrane Vapor Permeation of Ethanol-Water Solutions

The procedure of Example 12 was repeated multiple times with different initial ethanol-water solution concentrations. The coating of the TAF-1600 composition selectively permeable membrane layer on the hollow fibers was 0.23 or 0.30 µm. The conditions and results for these examples are presented in Table 5, below.

Comparison of the data from Table 5 with that of Table 3 (Exs. 12-14) shows that the water permeability through the thin selective layer membranes were only slightly higher than for the thicker membranes. However, the water and ethanol fluxes of the thin membranes were significantly higher and often orders of magnitude greater than those of the thick selective layer membranes.

eter in the range of 0.3 to 0.9 mm (bulk density: 430 kg/m³ and water content <3% w/w). It was stored at 4° C. until used. Geraniol (98%) and glacial acetic acid (>99.7%) were present at stoichiometric ratio at 0.1 molar concentration. Concentration of enzyme in the reaction mass was 10 wt. %. The materials were charged to the flask in the sequence of catalyst, geraniol, solvent and acetic acid. The reaction was carried out at 30° C. using a heating mantle with an agitator stifling the mass at 200 rev. per min. A reflux condenser was used to return vapor to the reaction mass.

Figure 12:
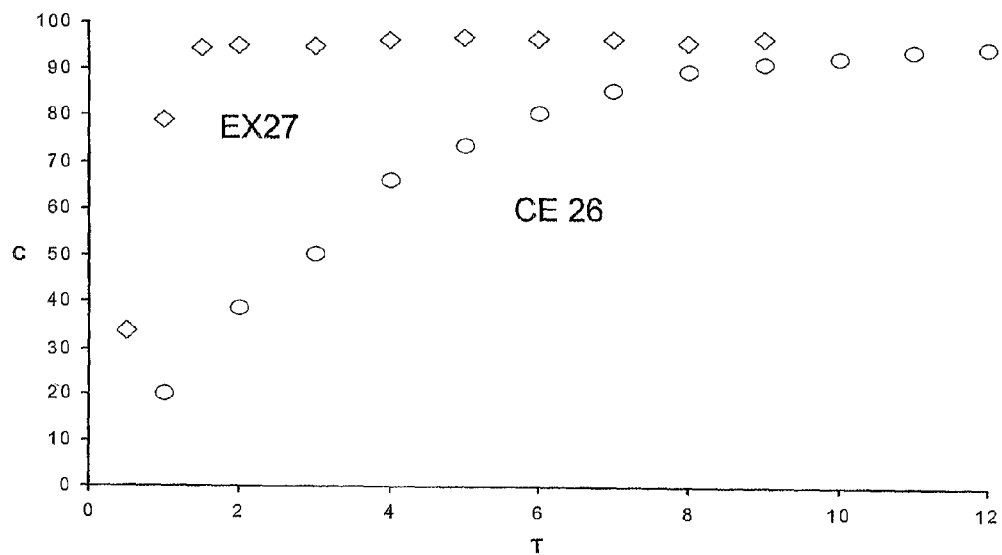
FIG. 12 is a plot of percent conversion of geraniol to geranyl acetate as a function of reaction time in hours in accord with a examples disclosed herein below.
Figure 13:
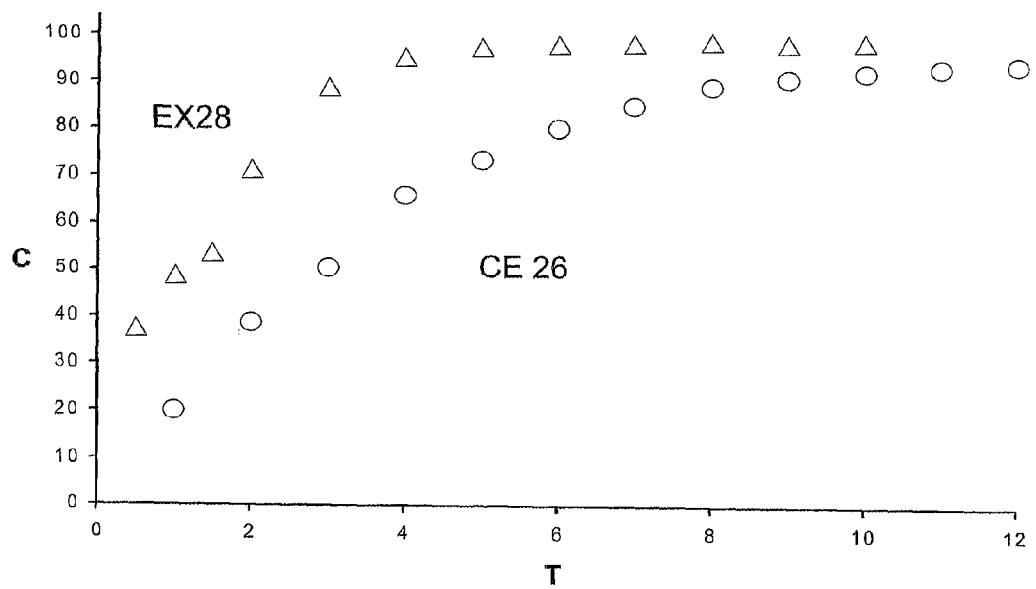
FIG. 13 is a plot of percent conversion of geraniol to geranyl acetate as a function of reaction time in hours in accord with examples disclosed herein below.

The reaction continued for approximately 12 h with 1 mL samples taken periodically. Of the samples 1 µL aliquots were quantitatively analyzed chromatographically. A model 3800 (Varian, Inc.) chromatograph with flame ionization detector, and 30 m long 0.25 mm inner diameter DB-WAX capillary column was used with a 30° C. per min. ramp from 56-200° C. was used. At these conditions acetic acid, geranyl acetate and geraniol had retention times of 13.4 min., 15.4 min. and 15.7 min., respectively. Conversion values were calculated on the basis of geraniol present in the sample relative to the initial geraniol amount. Conversion values are plotted as a function of duration of reaction and labeled "CE26" in FIGS. 12 and 13. Conversion rose monotonically as the reaction proceeded and asymptotically approached an equilibrium value of 94%.

Example 27

Enzyme Catalyzed Formation of Geranyl Acetate with Byproduct Water Removal Using a Flat Membrane The chemical reaction as described in Comp. Ex. 26 was repeated with the reactor flask 121 connected to the testing apparatus schematically illustrated in FIG. 11 such that the

TABLE 5

|  | Ex. 20 | Ex. 21 | Ex. 22 | Ex. 23 | Ex. 24 | Comp. Ex. 25 |
| --- | --- | --- | --- | --- | --- | --- |
| TAF-1600 layer thickness | 0.23 | 0.23 | 0.23 | 0.23 | 0.30 | 0.30 |
| Liquid Feed Ethanol, wt % | 96 | 95 | 81 | 87 | 65 | 0 |
| Liquid Feed Water, wt % | 4 | 5 | 19 | 13 | 35 | 100 |
| Feed Temperature, ° C. | 103 | 102 | 105 | 106 | 104 | 106 |
| Feed Pressure, psia | 14.7 | 14.7 | 14.7 | 16.7 | 18.7 | 14.7 |
| Feed flow, mL/min. | 5 | 5 | 5 | 5 | 5 | 5 |
| Retentate Pressure, psia | 14.7 | 14.7 | 14.7 | 14.7 | 14.7 | 14.7 |
| Permeate Pressure, in Hg abs. | 1.91 | 2.91 | 2.91 | 1.91 | 2.91 | 3.91 |
| Sweep component | He | He | He | He | He | He |
| Sweep flow, std. cm³/min. | 50 | 50 | 50 | 50 | 50 | 50 |
| Permeate Ethanol, wt % | 71 | 68 | 35 | 38 | 34 | 0 |
| Permeate Water, wt % | 29 | 32 | 65 | 62 | 66 | 100 |
| Permeate mass, g | 15 | 12 | 22 | 20 | 40 | 52 |
| Water Permeability, Barrer | 2727 | 2585 | 2582 | 2346 | 3883 | 3709 |
| Water Flux, [mol/(cm²-sec)]/10$^{-7}$ | 33 | 29 | 109 | 94 | 220 | 398 |
| Ethanol Flux, [mol/(cm²-sec)]/10$^{-7}$ | 32 | 24 | 23 | 23 | 19 | 0 |

Comparative Example 26

Enzyme Catalyzed Formation of Geranyl Acetate without Byproduct Water Removal

Into a cleaned 500 ml round bottom glass flask were placed catalyst, n-hexane solvent and reactants totaling 220 mL reaction volume to produce geranyl acetate by reaction of geraniol with acetic acid. The catalyst was Novozyme® 435 enzyme (Novozymes A.S., Denmark), a non-specific thermostable lipase from *Candida Antartica* classified as a tryacylglycerol hydrolase (E.C. 3.1.1.3). The enzyme was immobilized on spherical, macroporous, acrylic resin particles with a diamreaction mass continuously recirculated in contact with a perfluoropolymer membrane. The heating mantle is represented by element 122. The agitator and reflux condenser are not shown. The reaction mass 126 was pumped to a membrane holder 129 by pump 123 via ⅛ inch diameter tubing 128. The membrane holder contained a flat membrane 130 consisting of a layer of TAF-1600 copolymer on a porous substrate of expanded polytetrafluoroethylene ("e-PTFE"). The membrane was a 47 mm diameter circular sheet having 13.8 cm² effective area for permeation and was in the range of 3-6 µm thick. Prior to carrying out the experiment, the membrane was subjected to pure nitrogen, oxygen and helium gas permeation tests which measured oxygen/nitrogen and helium/nitrogen selectivities close to the ideal values and thereby confirmed that the TAF-1600 layer was nonporous. A filter element was deployed in the pump suction line to prevent fouling the recirculation system by the catalyst particles. After contacting the membrane, the liquid reaction mass was recirculated to flask 121 via tubing 131.

Suction of less than 250 mTorr was drawn on the permeate side of membrane 130 by vacuum pump 133 and tubing 137 to create a driving force for pervaporation of reaction mass components through the membrane. Cold trap 132 was used to capture permeate for mass balance purposes. A flow of nitrogen gas 134 was swept across the permeate side of the membrane. As a consequence of pervaporation, water preferentially permeated the membrane and was thereby removed from reaction mass while being produced by the esterification.

The reaction continued for about 9 hours during which samples were taken and analyzed as in Comp. Ex. 26. Percent conversion "C" of the geraniol was determined and is plotted as a function of reaction duration "T" in hours as points labeled "EX. 27" in FIG. 12. The data of this figure demonstrate that equilibrium conversion of 96% was higher than was attained in Comp. Ex. 26 (94%) in which water byproduct was not removed.

Example 28

Enzyme Catalyzed Formation of Geranyl Acetate with Byproduct Water Removal Using a Hollow Fiber Membrane Module For Example 28 the procedure of Ex. 27 was repeated except that a hollow fiber membrane module of the general type as element 95 (FIG. 9) was substituted for the membrane holder and the flat membrane. The hollow fiber module contained 15 microporous polysulfone fibers of 30.5 cm active length, 305 μm inner diameter and 488 μm outer diameter which provided an effective surface area for permeation of 70 cm$^2$. The inside surface of the fibers was coated with a layer of TAF-1600 copolymer of about the same thickness as in Ex. 16. In addition to substituting a hollow fiber membrane module for the flat sheet membrane, the molar ratio of acetic acid/geraniol was increased from 1 to 2. Results of percent conversion "C" vs. reaction time "T" in hours are plotted as points Ex. 28 in FIG. 13. These data show that the equilibrium conversion achieved is 98% which is significantly higher than 94% maximum conversion attained in Comp. Ex. 26.

Although specific forms of the invention have been selected in the preceding disclosure for illustration in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. A method of removing water from a feed composition comprising a product component and water, the method comprising the steps of (i) providing a membrane separation system comprising at least one membrane comprising a selectively permeable layer comprising a polymer or copolymer of perfluoro-2,2-dimethyl-1,3-dioxole, (ii) contacting the membrane with the feed composition in which the water is present at an initial concentration, (iii) permeating the feed composition through said membrane in which the water transfers through said membrane preferentially relative to the product component, thereby selectively removing water from the feed composition, and (iv) recovering from said membrane separation system a product composition comprising the water at a final concentration substantially lower than the initial concentration in which the permeating step comprises vapor permeation, pervaporation or a combination thereof and in which membrane permeation is the exclusive mechanism for removing water from the feed composition.

2. The method of claim 1 in which the feed composition consists essentially of about 0.5-98 wt % water and a complementary amount of ethanol, and in which the method comprises recovering from said membrane separation system a product composition of ethanol having a final concentration of less than about 0.5 wt. % water.

3. The method of claim 2 in which the water concentration of the feed composition introduced to the membrane system is in the range of about 3-98 wt %, and in which the permeance of water through the membrane is greater than about $9 \times 10^{-4}$ kmol/m$^2$-hr-mm Hg.

4. The method of claim 2 in which the water concentration of the feed composition is 3-15 wt %, and in which the permeating step comprises vapor permeation, pervaporation or a combination thereof.

5. The method of claim 4 which comprises placing the feed composition in the vapor state, contacting the feed composition with a first side of the membrane in a single stage membrane separator and withdrawing the product composition from the single stage membrane separator on the first side of the membrane.

6. The method of claim 1 in which the product component is selected from the group consisting of (i) a compound that forms an azeotrope with water, and (ii) a compound that has a relative volatility with respect to water in the range of about 1.0-1.1, in which the relative volatility (a) is defined as being equal to $(y_a/x_a)/(y_b/x_b)$ where $y_a$ is the mole fraction of the product component in a vapor phase mixture at equilibrium at temperature and pressure of the feed composition in contact with the membrane, where $x_a$ is the mole fraction of the product component in a liquid phase mixture at equilibrium at temperature and pressure of the feed composition in contact with the membrane, where $y_b$ is the mole fraction of water in said vapor phase mixture, and where $x_b$ is the mole fraction of water in said liquid phase mixture.

7. The method of claim 6 in which the product component is selected from the group consisting of organic chemicals, inorganic acids, and compounds that form azeotropic mixtures with water.

8. The method of claim 7 in which the product component is selected from the group consisting of butyl alcohol, ethyl alcohol, isopropyl alcohol, acetic acid, n-propanol, acetonitrile, tetrahydrofuran, methyl ethyl ketone, nitric acid, hydrogen fluoride, hydrogen chloride, hydrogen bromide, hydrogen iodide, ethylene glycol and mixtures thereof.

9. The method of claim 1 in which the product component is a hydrocarbon oil, and the water is present in the feed composition in contact with said membrane as (i) a single fluid phase of a solution of water and the oil or as (ii) multiple fluid phases comprising an oil-rich phase having a minor fraction of water dissolved in a major fraction of the oil and a water-rich phase comprising a minor fraction of the oil.

10. The method of claim 9 in which the initial concentration of water in the feed composition is greater than about 1 wt %, the final concentration of water in the product composition is less than about 0.5 wt %, and in which membrane permeation is the exclusive mechanism for removing water from the feed composition.

11. The method of claim 9 in which initial concentration of water is at least about 1000 parts per million by weight of the feed composition and the final concentration of water is less than about 400 parts per million by weight of the product composition.

12. The method of claim 11 in which initial concentration of water is less than about 2500 parts per million parts by weight of the feed composition.

13. The method of claim 9 in which applying the driving force comprises drawing a vacuum on a permeate side of the membrane and which method further comprises introducing a sweeping flow of dry, inert gas in contact with said permeate side.

14. A method of removing water from a feed composition comprising a product component and water, the method comprising the step of permeating the feed composition through a selectively permeable membrane comprising a nonporous layer of a polymer or copolymer of perfluoro-2,2-dimethyl-1,3-dioxole, in a membrane separation process selected from the group consisting of vapor permeation, pervaporation and a combination thereof and being exclusive of mechanisms other than a membrane separation process for removing water from the feed composition, in which water comprises about 0.5-90 wt % of the water and the product component in the feed composition, in which the water transfers through the membrane preferentially relative to the product component, and in which water permeance is at least about $9 \times 10^{-4}$ kmol/$m^2$-hr-mmHg.

15. The method of claim 14 in which water is less than about 10 wt % of the water and the product component in the feed composition.

* * * * *

UNITED STATES PATENT AND TRADEMARK OFFICE
CERTIFICATE OF CORRECTION

PATENT NO. : 8,506,815 B2
APPLICATION NO. : 13/552745
DATED : August 13, 2013
INVENTOR(S) : Stuart M. Nemser et al.

It is certified that error appears in the above-identified patent and that said Letters Patent is hereby corrected as shown below:

In the Specification

In column 22, lines 17-18
 change "85% ethanol/15% distilled water"
 to -- 85% distilled water/15% ethanol --

In column 23, line 20
 change "Example 12"
 to -- Example 14 --

In the Claims

In claim 6, at column 28, line 35
 change "volatility (a)"
 to -- volatility ($\alpha$) --

Signed and Sealed this
Seventeenth Day of September, 2013

Teresa Stanek Rea
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,506,815 B2 |
| APPLICATION NO. | : 13/552745 |
| DATED | : August 13, 2013 |
| INVENTOR(S) | : Stuart M. Nemser et al. |

It is certified that error appears in the above-identified patent and that said Letters Patent is hereby corrected as shown below:

In the Specification

In column 1, on line 7, immediately above "FIELD OF THE INVENTION", insert the following paragraph:

-- Support was provided under Department of Energy awards DE-FG02-05ER84224; DE-FG01-06ER84528; and DE-FG02-06ER86268. The U.S. government has rights in this patent application. --

Signed and Sealed this
Twenty-first Day of July, 2015

Michelle K. Lee
*Director of the United States Patent and Trademark Office*